United States Patent [19]

Kinoshita et al.

[11] 4,125,749
[45] Nov. 14, 1978

[54] KEY TELEPHONE SYSTEMS

[75] Inventors: Toshiharu Kinoshita, Atsugi; Yoshio Shinoda, Yokohama; Takashi Oyamada, Tokyo; Mitsuo Masuda, Higashi-Kanamachi; Noritomo Arai, Yokohama, all of Japan

[73] Assignee: Tamura Electric Works, Ltd., Tokyo, Japan

[21] Appl. No.: 711,975

[22] Filed: Aug. 5, 1976

[30] Foreign Application Priority Data

| Aug. 9, 1975 [JP] | Japan | 50-97027 |
| Dec. 30, 1975 [JP] | Japan | 51-158337 |
| Dec. 30, 1975 [JP] | Japan | 51-158338 |
| Dec. 30, 1975 [JP] | Japan | 51-179357[U] |

[51] Int. Cl.² .................................................. H04M 1/00
[52] U.S. Cl. ................................... 179/99; 179/18 J
[58] Field of Search ............... 179/99, 18 F, 18 FA, 179/18 J; 340/169, 170

[56] References Cited

U.S. PATENT DOCUMENTS

| 3,244,986 | 4/1966 | Rumble | 340/170 |
| 3,660,611 | 5/1972 | Knollman et al. | 179/99 |
| 3,691,310 | 9/1972 | Fenton | 179/99 |
| 3,843,845 | 10/1974 | Ridley | 179/99 |
| 3,935,396 | 1/1976 | Barsellotti et al. | 179/99 |
| 3,973,085 | 8/1976 | Shiff | 179/99 |
| 4,010,331 | 3/1977 | Taylor et al. | 179/99 |
| 4,027,110 | 5/1977 | Takematsu et al. | 179/99 |

Primary Examiner—William C. Cooper
Assistant Examiner—Gerald L. Brigance
Attorney, Agent, or Firm—Charles E. Pfund

[57] ABSTRACT

The key button telephone system comprises a key service unit and a plurality of key telephone units. The key service unit and each key telephone unit are interconnected by a pair of cables, one of which is used as a talking circuit and the other is used to transmit and receive information signals and operating power. The key service unit comprises a line circuit for supervising the state of a line, a station unit for supervising the line circuit, and for supplying to the key telephone unit an information signal representing the state of the line and the operating power, a switching network controlled by the control output from the station unit for connecting the key telephone unit to the line, and a common control circuit for controlling the line circuit and the station unit. Each key telephone unit comprises a telephone circuit connected to the switching network, a telephone control circuit for supervising the state of the key telephone unit connected to the station unit, and a DC converter for converting a DC voltage supplied from the station unit into a predetermined DC voltage.

8 Claims, 30 Drawing Figures

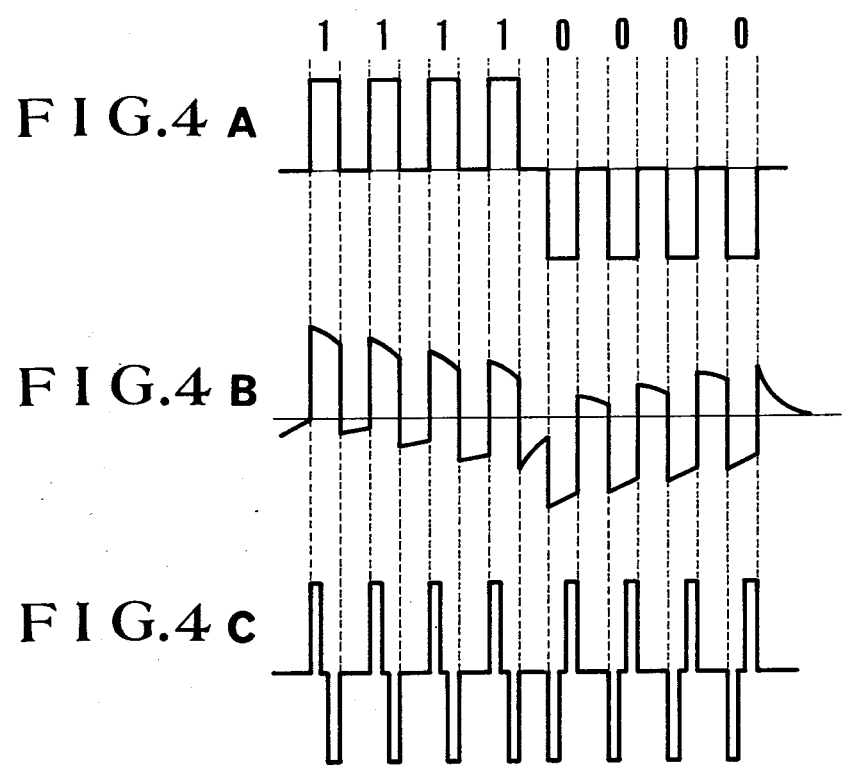

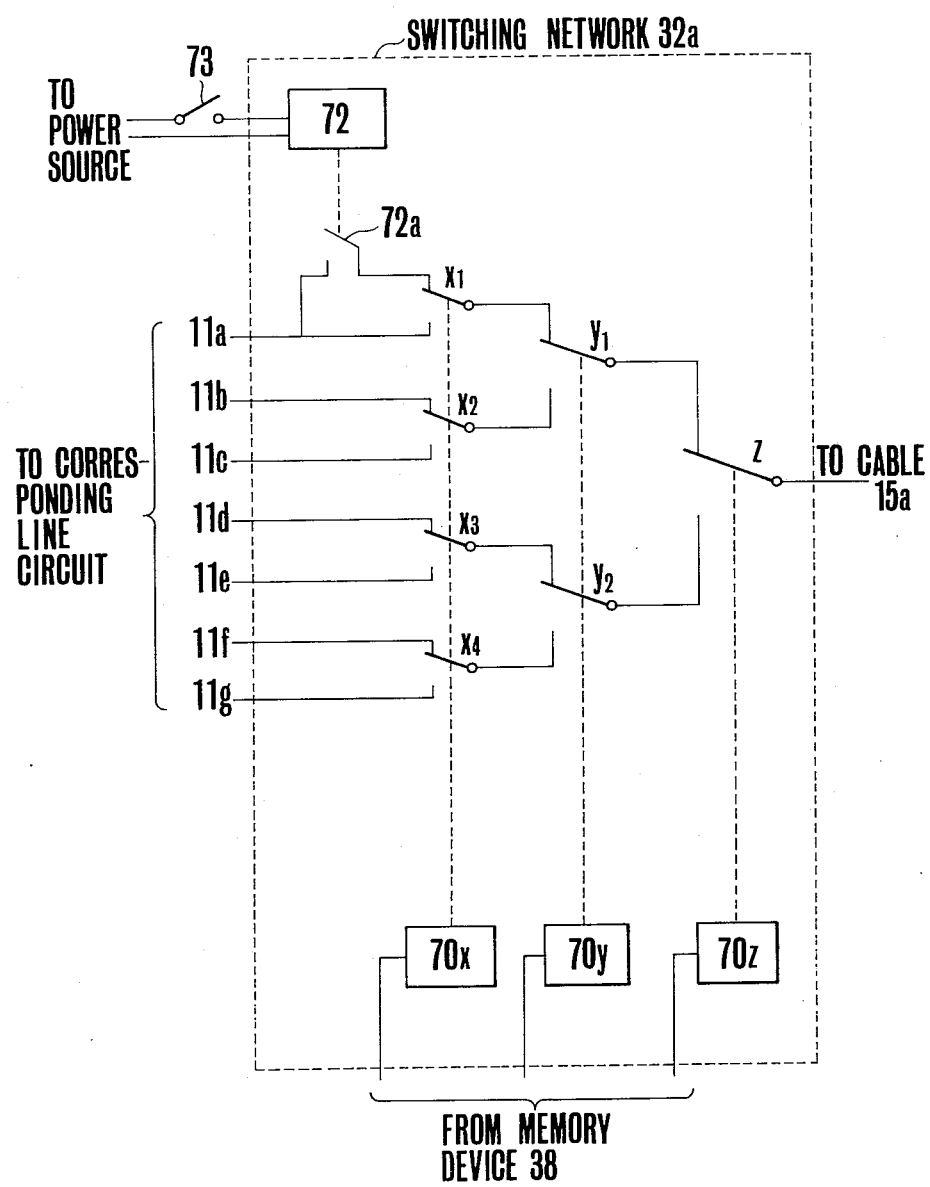

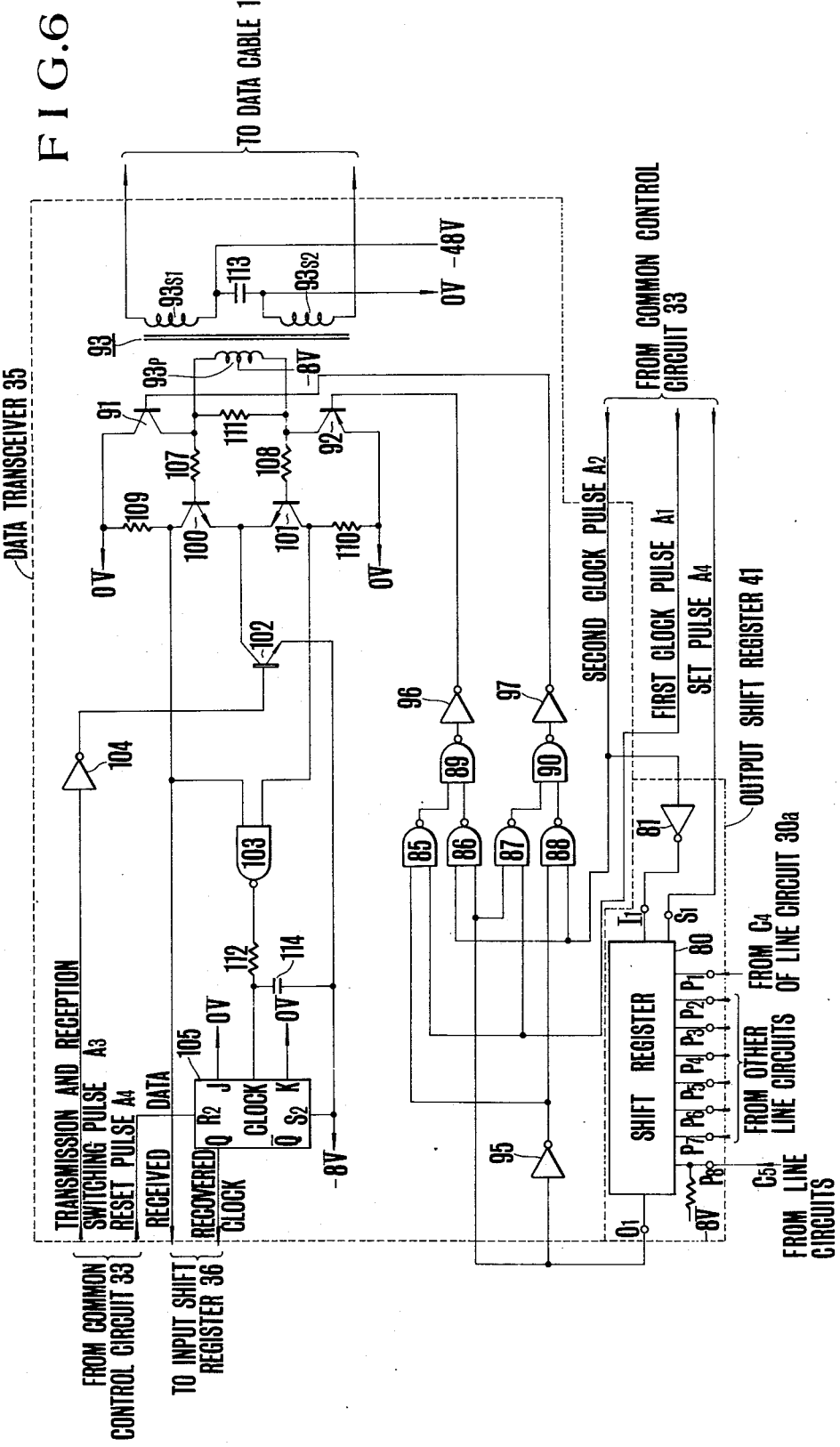

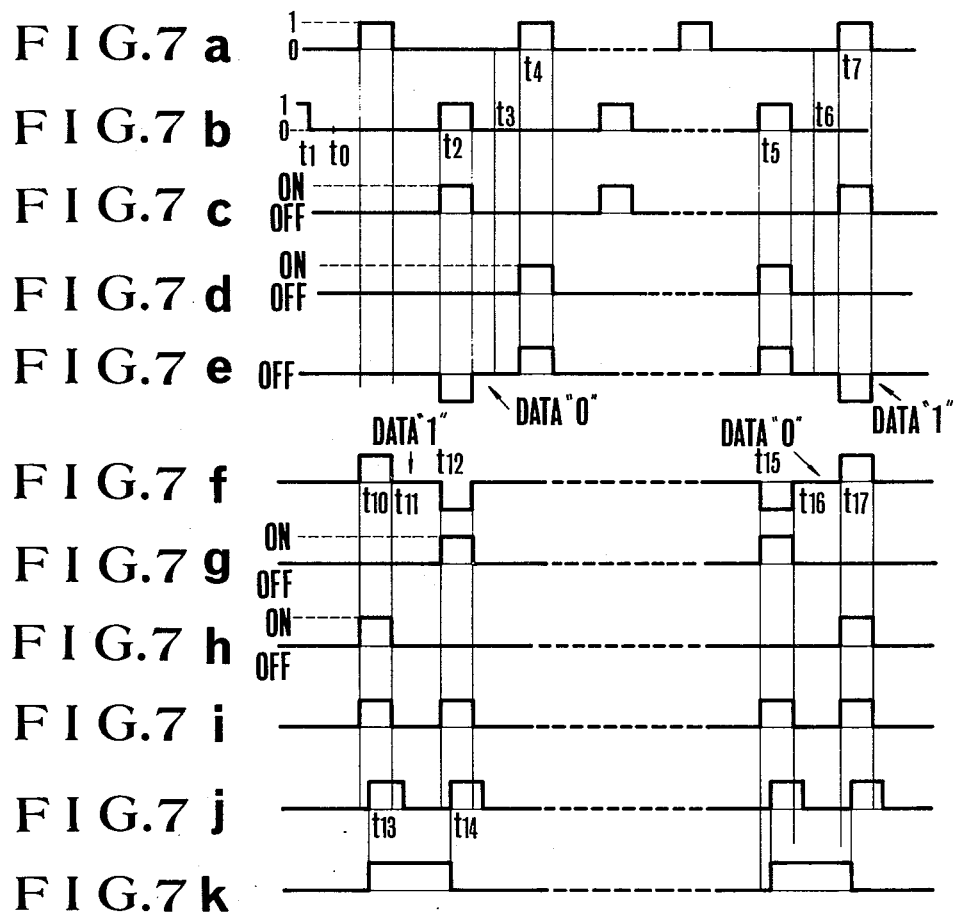
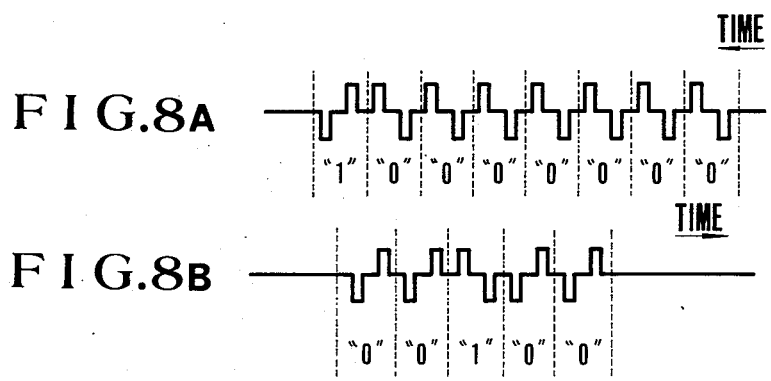

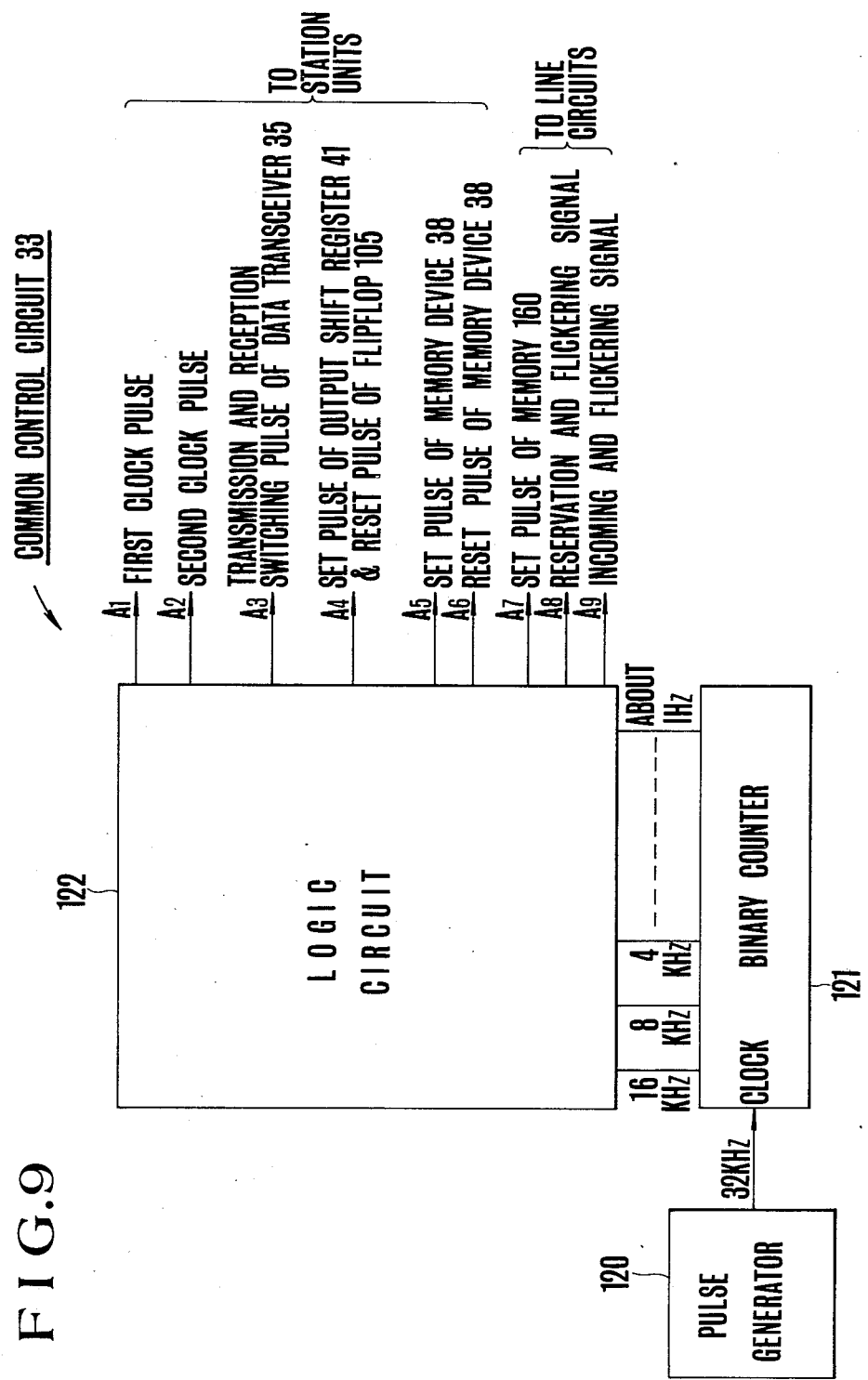

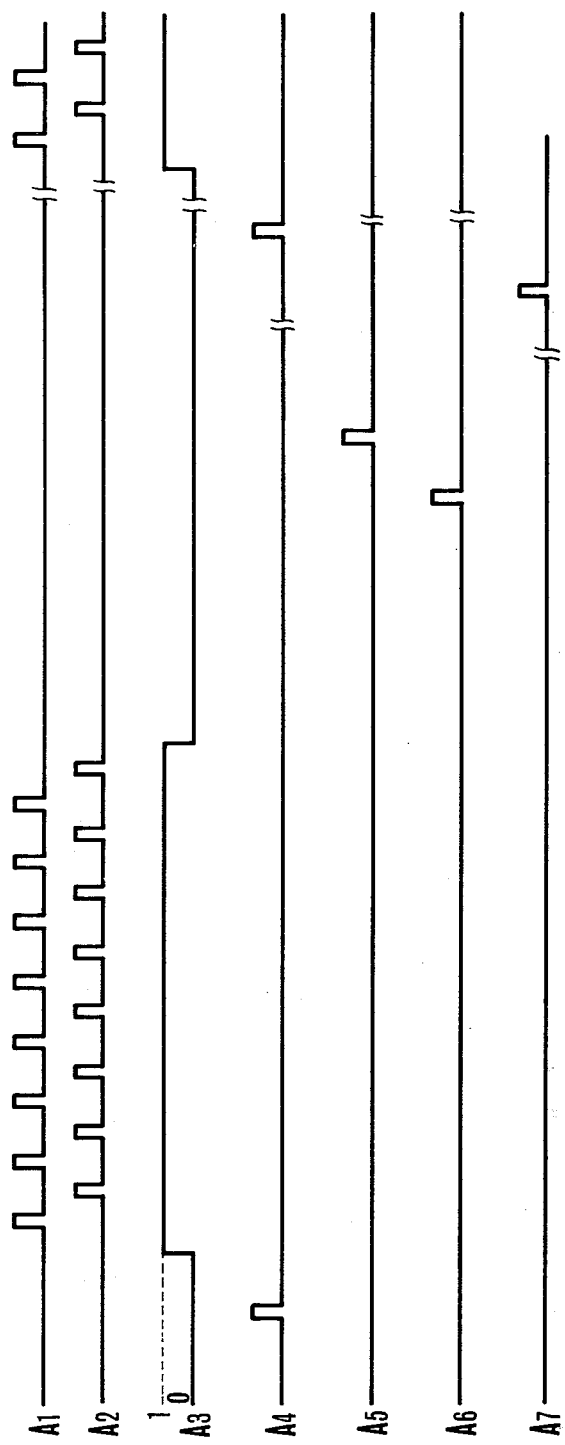

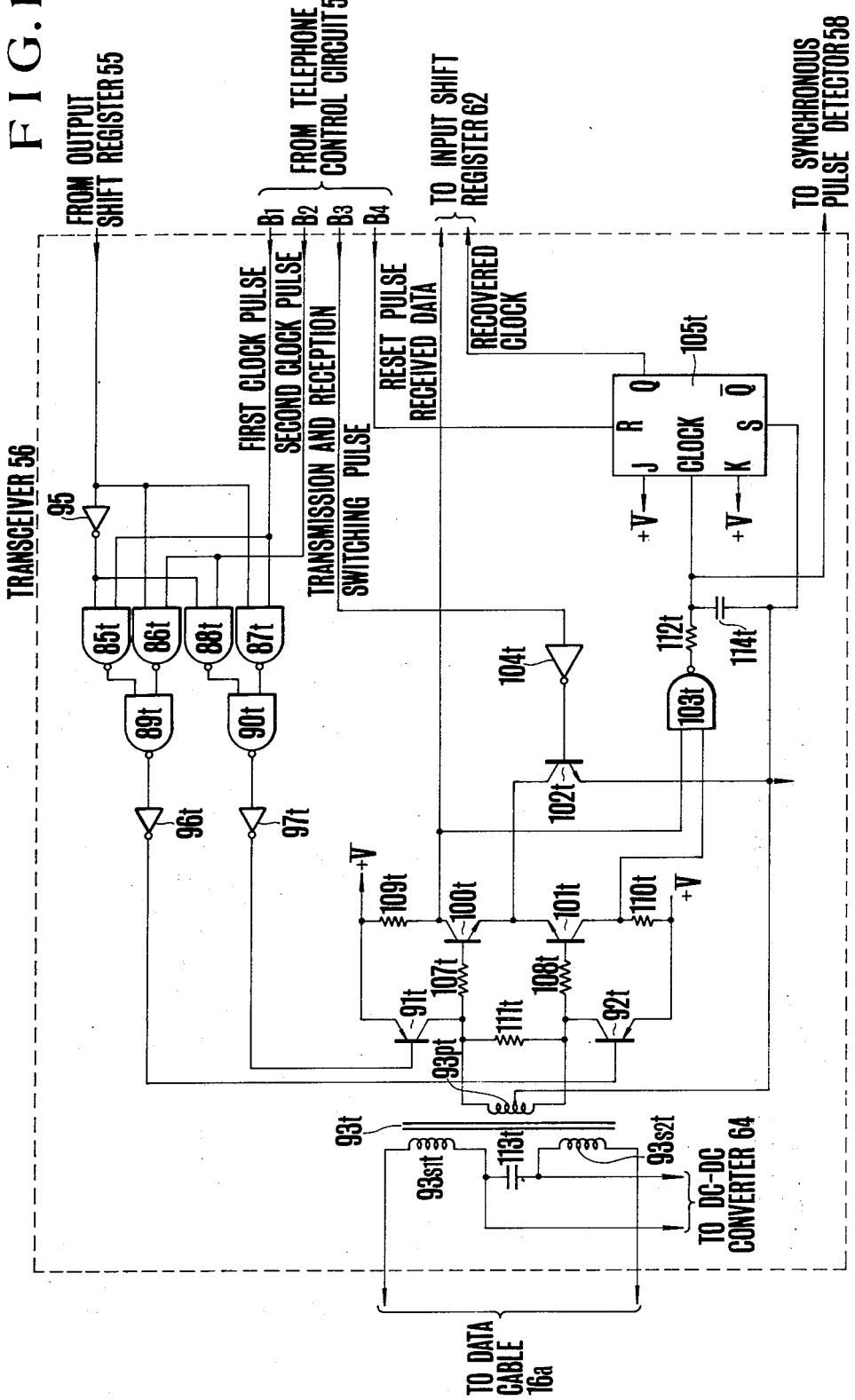

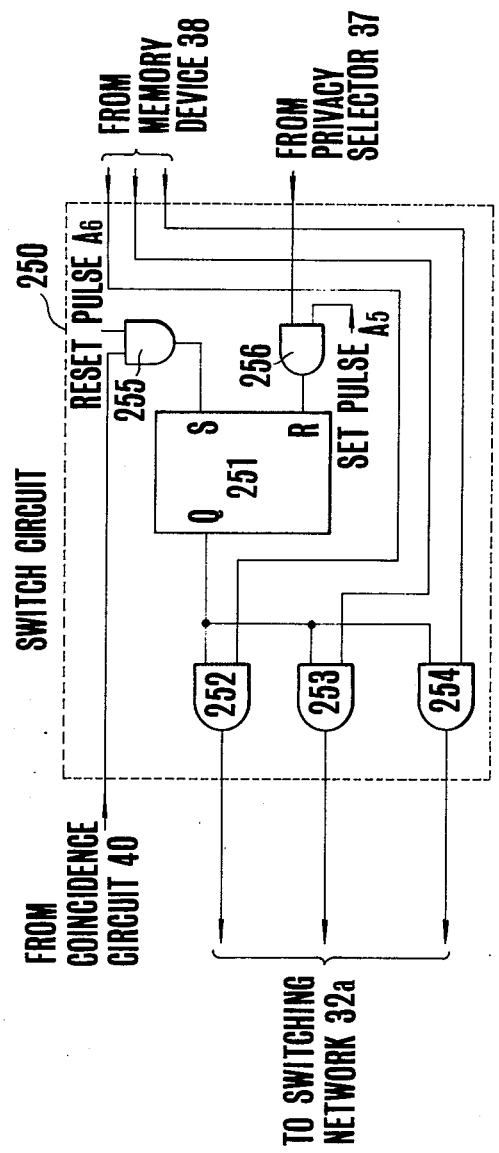
F I G. 17

KEY TELEPHONE SYSTEMS

BACKGROUND OF THE INVENTION

This invention relates to a key telephone system comprising a main device or a key service unit connected to an office line and a plurality of key telephone units.

With an increase in the amount of information communications in recent years a key telephone system combining the effective utilization and the function of an interphone has been used extensively.

A prior art key telephone system comprises a main device including relays and a source of power, a plurality of telephone units each provided with key buttons for selecting office lines, and an office cable for interconnecting the telephone units. To provide a response and a transmission to a particular office line, an office line selection key corresponding to the particular office line is manually depressed thereby enabling a single key telephone unit to utilize many office lines. Examples of such system are disclosed in Japanese patent publication No. 17,449 of 1976 and U.S. Pat. No. 3,115,551.

The office cable used in such a key telephone system generally comprises a pair of talking lines, a control line and a plurality of lines for interconnecting telephone sets by the manual operation of keys and the number of the lines comprising the cable increases with the number of telephone sets so that the wiring operation of the cable becomes troublesome and requires much labour.

In addition to the cost and labour required for the system the trouble caused by misconnections increases also. Further such system requires the use of wiring connectors of the multiple terminal type, and the diameter of the cable increases. Consequently, a large space is required to install the cable and the cost of the cable increases.

In the prior art key telephone system a plurality of switching networks corresponding to the plurality of telephone units are installed in the main device. Since such switching network is used to interconnect an office line corresponding to an office line selection key button and a telephone unit in accordance with an information or data corresponding to said key button, while a user of a telephone unit is talking through one office line, the content of the speech is tapped by another user if he hangs off the handset and then depresses an office line selection key corresponding to said office line. Accordingly, it is necessary to prevent such tapping.

Heretobefore such tapping has been prevented by adding a relay to the button telephone set, which renders operative or inoperative an office line between a switching network and a telephone line circuit of a given telephone unit when the office line is in a busy condition. With this method, however, it is necessary to provide such relay for each telephone unit thus complicating the system. Further, as the number of the telephone unit increases, the number of the lines of the cable interconnecting the main device and the telephone units increases so that the connecting operation of the cable becomes troublesome. This increases the cost of installation.

Moreover, in such secret telephone system it is impossible to release the secrecy. If possible, all telephone sets are released from secret state so that it is impossible to release the secret state of a particular telephone set.

Further, in the prior art key telephone system, when the source in the main device becomes inoperative due to interruption of the supply of electric power for example, the main device will be completely isolated from the office lines thus rendering inoperative the entire system. For this reason, at the time of the failure of the source it has been necessary to make it possible to talk by using a particular office line by closing a switch.

SUMMARY OF THE INVENTION

Accordingly, it is an object of this invention to provide an improved key telephone system capable of simplifying the wirings between the main device and the key telephone sets and improving the capability of the system than the prior art system.

Another object of this invention is to provide an inexpensive key telephone system requiring lesser labour of wiring than the prior art system.

Still another object of this invention is to provide an improved key telephone system capable of simplifying the wirings between the main device and respective telephone sets without changing the dial circuits of the telephone sets by merely adding some elements.

A further object of this invention is to provide a key telephone system capable of transmitting speeches and control data between the telephone sets and the main device with a relatively simple construction.

Still further object of this invention is to provide a key telephone system incorporated with a secrecy preserving measure capable of preventing tapping of the speech.

Another object of this invention is to provide a key telephone system capable of readily releasing the secret state during talking.

Another object of this invention is to provide a key telephone system capable of releasing the secret state only for a particular telephone set.

Yet another object of this invention is to provide an improved key telephone system capable of ensuring a communication by using a particular office line at the time of the failure of the source of supply.

Still another object of this invention is to provide a key telephone system capable of correctly transmitting control information from the main device to the telephone sets.

According to this invention these and other objects can be accomplished by providing a key telephone system of the type comprising a key service unit and a plurality of key telephone units adapted to be connected with the key service unit, each key telephone unit being provided with a plurality of line selection key buttons, characterized in that there are provided pairs of a single talking cable and a single data cable extending between the key service unit and respective key telephone units, that the key service unit comprises a plurality of line circuits respectively supervising the states of respective lines, a plurality of station units for performing the supervision of the line circuits and for supplying phase modulated data signals and an operating power to respective key telephone units through the data cables, a plurality of switching networks controlled by the outputs from station units for connecting a selected line to a key telephone unit corresponding to a predetermined station unit through a line circuit, and a common control circuit for controlling the operations of the line circuits and the station units, and that each key telephone unit comprises a telephone circuit connected to the key service unit through one of the talking cables, a handset connected to the telephone circuit, means connected to a corresponding station unit of the key service unit through a data cable for supervizing the condition of the key telephone unit, said means transmitting and receiving data to and from the station unit, and converting means for converting the pulse modulated signal sent from the station unit into predetermined DC voltage for operating the key telephone unit.

BRIEF DESCRIPTION OF THE DRAWINGS

Further objects and advantages of the invention can be more fully understood from the following detailed descriptions taken in conjunction with the accompanying drawings in which:

FIGS. 4A, 4B and 4C are waveforms showing the comparison of the transmitting system utilized in the key telephone system of this invention and that of the prior system.

FIG. 5 is a block diagram showing one example of the switching network shown in FIG. 2;

FIG. 6 is a connection diagram showing one example of a data transceiver and an output register constituting a station unit;

FIGS. 7a through 7k are waveforms useful to explain the operation of various elements shown in FIG. 6;

FIGS. 8A and 8B are waveforms showing examples of the data transmitted over a data cable;

FIG. 9 is a block diagram showing one example of a common control circuit of the main device;

FIG. 10 shows the waveforms of the pulses sent from the common control circuit shown in FIG. 9;

FIG. 13 is a connection diagram showing one example of the data transceiver comprising the telephone unit shown in FIG. 3;

FIG. 17 is a block diagram showing the detail of one example of the switch circuit shown in FIG. 16.

DESCRIPTION OF THE PREFERRED EMBODIMENTS

General construction

Figure 1:
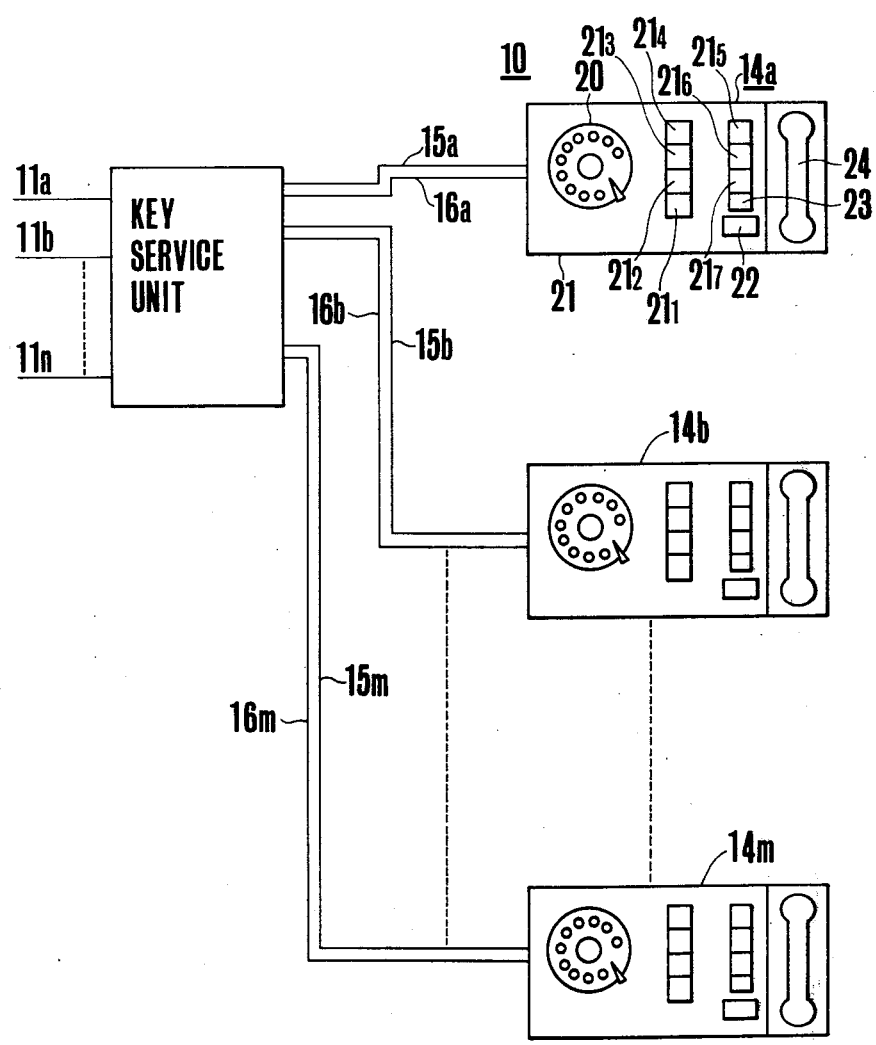
FIG. 1 is a block diagram showing the entire construction of the key telephone system of this invention.

The general construction of the novel key telephone system of this invention is shown in FIG. 1 and comprises a main device or a key service unit 12 connected with a plurality of lines 11a, 11b ... 11n. The key circuit unit 12 comprises various control circuits to be described hereunder. Further, the main device 12 is connected with a plurality of telephone units 14a, 14b ... 14m respectively through talking cables 15a through 15m, each comprising two lines and through control cables 16a through 16m, each comprising two lines. Interconnection of the main device and each telephone unit by a single talking cable and a single control cable comprises one of important features of this invention.

Respective telephone units have the same construction so that only one of them will be described. For example, telephone unit 14a comprises a main body 21 containing a dial 20 and other mechanisms and circuits required for a telephone set, seven key buttons $21_1$ through $21_7$ for selecting a line, a secrecy releasing button 22, a reservation button 23 and a handset 24 comprising a transceiver. The control information produced by the operation of these buttons is transmitted to the main device 12 through the control cable 16 which is also used to supply operating power to the telephone unit from the main device 12.

In this manner, as the main unit is connected to each telephone unit through only one talking cable and only one control cable, the wiring therebetween is independent of the increase and decrease in the number of telephone units thus simplifying the change of design. This greatly reduces the cost of installation and labour. Accordingly, it is possible to provide much cheaper button telephone system than the prior art system.

Moreover it is very economical because a standard dial and a network for a telephone set exclusively used by a single subscriber or a local telephone set can be used without any modification and because an ordinary subscribers cable or a local cable can be used. In addition, there is a great advantages in that talking and data transmission can be made without any complicated means.

Figure 2:
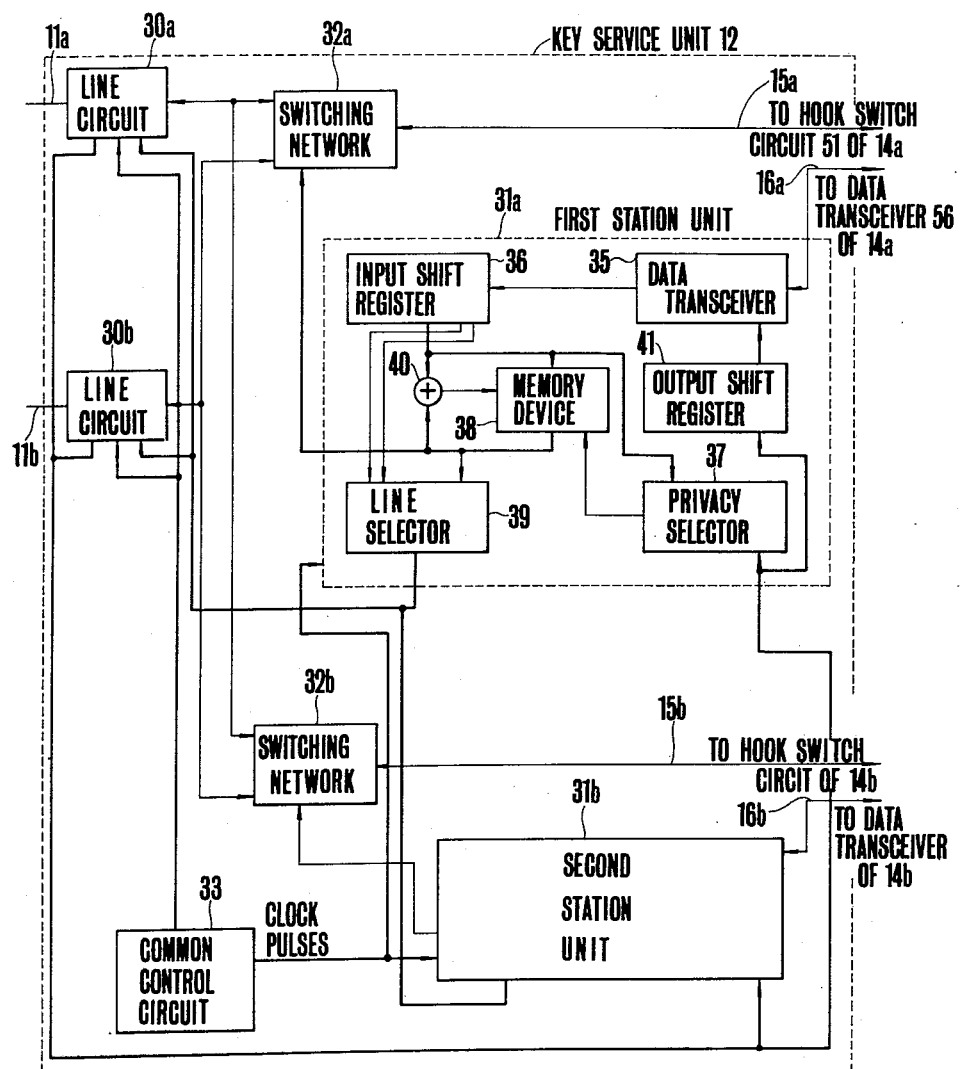
FIG. 2 is a block diagram showing a basic construction of the main device shown in FIG. 1.
Figure 3:
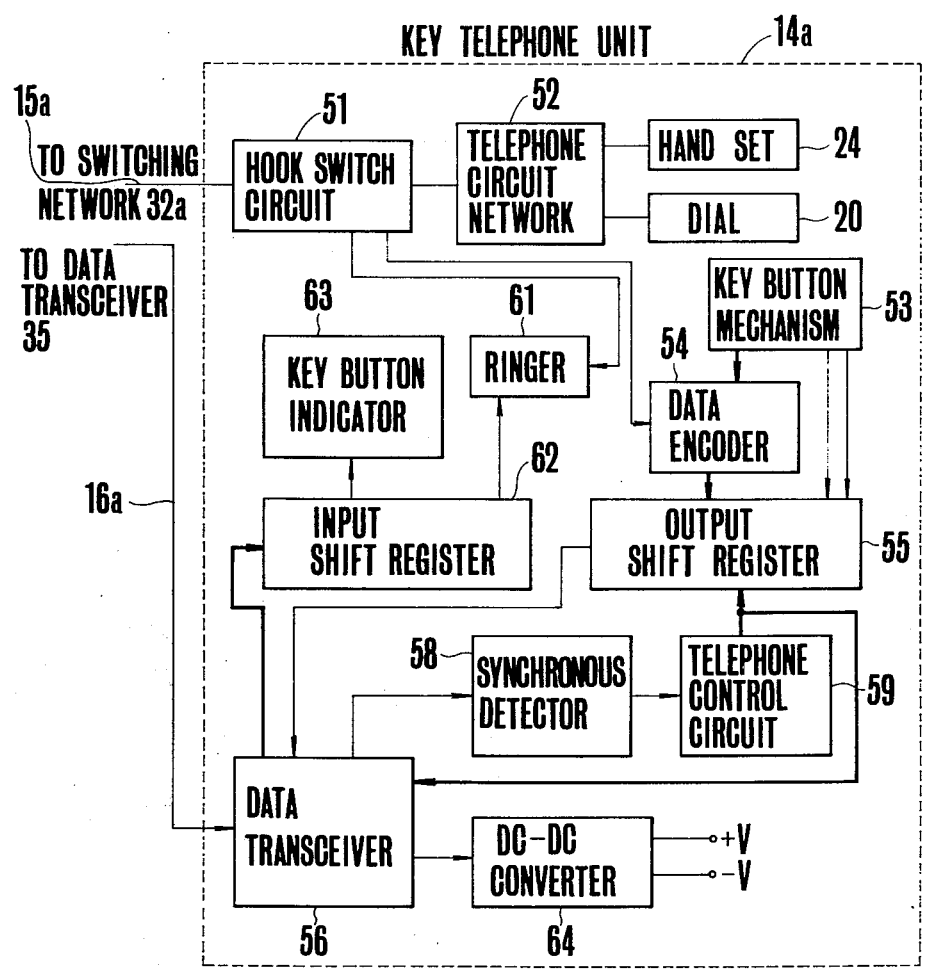
FIG. 3 is a block diagram showing the basic construction of the key telephone unit shown in FIG. 1.

In order to interconnect the main device 12 and each telephone set by two cables as shown in FIG. 1 the main device 12 and each telephone set are constructed as shown in FIGS. 2 and 3.

The construction of the main device 12 that is the key service unit 12 will first be described with reference to FIG. 2. Although in FIG. 2 only two telephone units are shown, actually there are provided many telephone sets. In this example, it is supposed that seven telephone units are provided. As shown, the key service unit 12 comprises first and second line circuits 30a and 30b, first and second station units 31a and 31b, first and second switching networks 32a and 32b controlled by the first and second station units 31a and 31b respectively and a common control circuit 33. Input terminals of the first and second line circuits 30a and 30b are connected to the office lines 11a and 11b respectively for supervising whether these lines are busy or idle to send corresponding supervisory signals to the first and second station units 31a and 31b respectively and to display the state of the lines in accordance with the line selection signals sent from the station units 31a and 31b. The first and second station units 31a and 31b are connected to receive information from telephone units 14a and 14b that is the control data corresponding to the line selection buttons, secrecy release button and reservation button for discriminating the supervisory signal sent from the first and second line circuits 30a and 30b in response to these data. Thus, when a line corresponding to the data is idle, the station units send a line selection signal to the first and second switching networks 32a and 32b. Further, in response to the data corresponding to the secrecy release button the first and second station units operate to interrupt the reply signal to the line circuits 30a and 30b thus releasing the secrecy. Further, in response to the data corresponding to the reservation button the station units operate to reserve the line circuits 30a and 30b. Each one of the first and second switching networks 32a and 32b comprises a plurality of switching elements corresponding to the number of lines and combined to form logical circuits. For example, where there are two lines a two contact switching elements is used whereas where there are seven lines three two contact switching elements are used. Thus, the first and second switching networks 32a and 32b comprise combinations of a plurality of switching elements which are driven to select lines corresponding to the first and second line selection signals sent from the first and second station units 31a and 31b.

The construction of the station units will now be described taking the first station unit 31a as an example. As shown in FIG. 2, the first station unit 31a comprises a data transceiver 35 adapted to transmit and receive data to and from telephone unit 14a via cable 16a, an input shift register 36 for temporarily storing the output data from the data transceiver 35, a privacy selector 37 responsive to the data from the input shift register 36 for determining whether the line is busy or idle and when the line is idle for sending a coincidence signal or an OK signal, a memory device 38 for storing the data of the input shift register 36 by utilizing the coincidence or OK signal from the privacy selector 37 as a set signal and for sending the stored data to the switching network 32a as a line selection signal and a line selector 39 for setting the line corresponding to the stored data to a reservation condition or a busy condition, a comparator 40 for sending a reset signal to the memory device 38 when the data in the shift register 36 does not coincide with the data stored in the memory device 38, and an output shift register 41 responsive to a supervisory signal corresponding to the busy condition or reservation condition of the line circuits 30a and 30b for driving display lamps of an indicator corresponding to the key buttons of the telephone set by a ringer for example. One input of the privacy selector is connected to the output terminals of the first and second line circuits 30a and 30b for supervising the reply signals sent from the first and second line circuits 30a and 30b in accordance with the data of the input shift register 36. The output of the line selector 39 is connected with the first and second line circuits 30a and 30b for setting the line circuits to the busy condition or the reservation condition in accordance with the data stored in the memory device 38 and for interrupting the reply signal sent from the line circuits 30a and 30b which have been set in the busy condition by the data corresponding to a secrecy release signal. More particularly, when a 5 bit data is sent from the key telephone unit 14 to the first station unit 31a the line selector 39 with its second to the least significant bit assigned to the secrecy release button 22, three most significant bits assigned to line selection key buttons 21₁ through 21₇, and the least significant bit assigned to the reservation button 23, operates to determine whether the secrecy release signal is to be sent to the line circuits 30a and 30b or to send a busy signal depending upon the presence or absence of one bit data at the second to the least significant bit which is transmitted to the input shift register 36. Further, whether a reservation signal of the line is to be sent or not is determined dependent upon the presence or absence of the one bit data. Further, depending upon the presence or absence of the data of the least significant bit whether the line reservation signal is to be sent to the line circuits 30a and 30b or not is determined. The purpose of the common control circuit 33 is to control the line circuits 30a and 30b and the first and second station units 31a and 31b.

Key Telephone Unit

The detail of the key telephone unit is shown in FIG. 3. Since all key telephone units have the same construction, the key telephone unit 14a will be described as the representative. The key telephone unit 14a comprises a hook switch circuit 51, a telephone circuit network 52 which constitute a portion of the main body 21 of the telephone set, a key button mechanism 53 including the line selection key buttons $21_1$ through $21_7$, the secrecy release button 22, and the reservation button 23 which are shown in FIG. 1, a data encoder 54 for transforming the data corresponding to respective buttons of the key button mechanism 53 into code signals, an output shift register 55 for serially and parallely converting the output from the encoder 54 and a data transceiver 56 for transmitting and receiving the data produced by the serial conversion by the output shift register 55 into the pulses of the opposite polarities. The key telephone unit 14a further comprises a synchronous detector 58 which extracts a synchronous pulse out of the data sent from the main device 12 and received by the data transceiver 56 and a telephone control circuit 59 responsive to the output from the synchronous detector 58 for producing a control signal which controls the output shift register 55 and the data transceiver 56. There are also provided a ringer 61 driven by the output from an input shift register 62 to be described later and connected to the output from the hook switch circuit 51 such that the ringer 61 is stopped when the hook switch is opened, the input shift register 62 applied with a data displaying the fact that to which line a signal has been applied and that which line should be selected, said data being extracted from the data received from or sent to the main device via the data transceiver 56, and a key button indicator 63 such as red lamps connected to the output of the input shift register 62 and corresponding to the line selection key buttons $21_1$ through $21_7$, the secrecy release button 22 and the reservation button 23. The key telephone unit 14a further comprises a DC-DC converter 64 for converting a DC power received from the main device 12 via the data transceiver 56 into DC voltages of +V and −V which are supplied to the various elements of the key telephone unit 14a as the source.

When line selection key buttons $21_1$ through $21_7$ of the key button mechanism 53 corresponding to the office lines are depressed, the data encoder 54 operates to form 3 bit code signals or data corresponding to the depressed buttons and the data is sent to the output shift register 55. When the secrecy release button 22, and the reservation button 23 of the key button mechanism 53 are depressed a "1" signal is applied directly to the output shift register 55. Thus, the data are applied to the output shift register 55 according to the following Table. In the Table the secrecy release bits and the reservation bits show the case wherein the secrecy release button and the reservation button are not depressed. In the Table significant bits are shown on the lefthand side.

Table

| button mechanism | line | line selection signal data | secrecy release bit | reservation bit |
|---|---|---|---|---|
| $21_1$ | 11a | 0 0 1 | 0 | 0 |
| $21_2$ | 11b | 0 1 0 | 0 | 0 |
| $21_3$ | 11c | 0 1 1 | 0 | 0 |

Table-continued

| button mechanism | line | line selection signal data | secrecy release bit | reservation bit |
|---|---|---|---|---|
| $21_4$ | 11d | 1 0 0 | 0 | 0 |
| $21_5$ | 11e | 1 0 1 | 0 | 0 |
| $21_6$ | 11f | 1 1 0 | 0 | 0 |
| $21_7$ | 11g | 1 1 1 | 0 | 0 |

The operation of the key telephone system shown in FIGS. 2 and 3 will now be described.

OPERATION OF THE KEY TELEPHONE SYSTEM

A. Transmitting Operation

When the user of the key telephone unit 14 depresses only the line selection button $21_1$ of the key button mechanism 53, for example, when all lines are idle a data code signal "00100" as shown in the code Table is sent to the output shift resistor 55 directly or through the data encoder 54 which sets the content of the data encoder 54 and the secrecy releasing and the reservation information in accordance with a set signal periodically supplied thereto from the telephone control circuit 59. The output shift register 55 sends the data to the data transceiver 56 in accordance with the pulse periodically supplied to the output shift register from the telephone control circuit 59.

The data transceiver 56 modulated the data into pulses having positive and negative polarities as will be described later with reference to FIG. 4 and sends the pulses to the data transceiver 35 of the first station unit 31a of the main device 12 via data cable 16a. Upon arrival of the bi-polar pulses, the data transceiver 35 demodulates the pulses into the original data "00100" which is sent to the input shift register 36. The data is periodically derived out of the shift register in accordance with a clock signal periodically supplied thereto from the common control circuit 33 and then sent to privacy selector 37. As has been assumed hereinabove, at this time since only the line selection button 21 is depressed and the secrecy release button 22 is not depressed the privacy selector 37 sends out a coincidence or OK signal to the memory device 38 to act as a set signal so that the memory device 38 stores the data $D_1$ of the input shift register 36 in response to this set signal. The memory device 38 sends the stored data to the switching network 32a to act as a line selection signal. In response to the line selection signal, the switching network 32a energizes a corresponding relay thereby connecting line 11a to the key telephone unit 14a.

In response to the data read out from the memory device 38, the selector 39 operates to select the first line circuit 30a of the line 11a to supply a reply signal to this line circuit 30a. In response to this data the line circuit 30a changes the contents corresponding to the privacy selector and the line to "0". Further, in response to the signal from the line circuit 30a, the output shift register 41 lights a display lamp, not shown, indicating that the line 11a is busy. In this case, the signal from the line circuit 30a is sent to the privacy selectors 37 and the output shift registers of all station units.

Transmission of the signal is done by the operations described above.

B. Secret Operation

At this time when the user of the key telephone unit 14b, for example, hooks-off the handset and depresses the selection key button $21_1$ corresponding to line 11a (See FIG. 1), the data "00100" corresponding to the key button $21_1$ is sent to the input shift register 36b of the second station unit 31b and stored temporarily in the shift register in the same manner as above described. However, since a signal corresponding to the busy state is sent to the privacy selector 37b of the station unit 31b from the first line circuit 30a the selector 37b will not send a coincidence or OK signal to the memory device 38b. As a consequence, the memory device cannot store the data of the input shift register 36b with the result that no line selection signal from the second station unit 31b is sent to the second switching network 32b, thus efficiently preventing tapping.

As has been described hereinabove, according to the key telephone system of this invention respective telephone units transmit data corresponding to their line selection key buttons to respective station units. In response to the transmitted data each station unit judges that whether a line corresponding to the data is busy or idle and when the line is idle, connects the line to the given key telephone unit, thereby positively preventing tapping of the speech.

C. Secrecy Release Operation

When the user of the key telephone unit 14a depresses the secrecy release button 22 (See FIG. 1) of the button mechanism while talking through its transceiver 24, the state of the bit next to the least significant bit of the encoder 54 changes from "0" to "1", the five bit data of the output shift register 55 will change to "00110". In the same manner as above described, this data is transmitted to the input shift register 36 via the data transceiver 56, the data cable 16a and the data transceiver 35 of the first station unit 31a of the main device 12. Then the state of the secrecy release bit of the shift register 36 changes from "0" to "1" and this secrecy release signal "1" is transmitted to a line selector 39 via the line. Consequently, the line selector 39 interrupts the data from the memory device 38 so that the reply signal to the first line circuit 30a disappears thus releasing the first line circuit 30a from the busy state. Consequently, when the user of the key telephone unit 14b hooks-off its transceiver depresses its line selection key button $21_1$ (See FIG. 1) a three bit data "001" corresponding to this key button and used to select a line is transmitted to the memory device 38b in the second station unit 31b in the same manner as above described and the transmitted data is stored in the memory device 38b in the second station unit 31b. At the same time the second station unit transmits a line selection signal corresponding to said line selection signal to the second switching network 32b whereby the network 32b is operated selectively by the line selection signal to connect line 11a with the key telephone unit 14b through cable 15b. Accordingly, the telephone unit 14b is offered to the talking provided through a line and the key telephone unit 14a thereby enabling talking among three parties.

As above described, according to this invention data corresponding to a line selection key button and secrecy release button are transmitted to the station unit from a key telephone unit. In response to the data corresponding to the line selection key button, the station unit judges that whether the selected line is busy or idle, and when the line is idle, connects the telephone unit to the line. Further, the station unit operates to interrupt the reply signal for supervizing the line in accordance with the line corresponding to the secrecy release button thereby releasing the secrecy. Thus, release of the secrecy of a secret telephone system can be made extremely readily. It is also possible to release the secrecy only when a specific condition is fulfilled.

D. Signal Incoming Operation

When a signal arrives at the line 11a when all lines are idle, the line circuit 30a detects such incoming signal to send a signal to the privacy selectors 37 and the output shift registers 41 of all station units. Then, the output shift register 41 transmits this data to the data transceivers 56 of respective key telephone units via the data transceiver 35 and the data cable 16a. The received data is used to send a signal to the key button indicator 63 via the input shift register 62 to light a lamp disposed close to key button 21, corresponding to the line 11a and to operate ringer 61.

When the user of the key telephone unit 14a hooks-off handset 24 in response to the arrival of the signal, hook switch circuit 51 sends to the ringer 61 a ringing stop signal produced by the operation of the hook switch. The user depresses the line selection button $21_1$ lighted by the lamp operated in accordance with the incoming signal. Thereafter, by the same circuit operation as in the signal outgoing operation the relay of the switching network 32 is operated to connect line 11a to the key telephone unit 41a through talking cable 15a.

E. Talking Termination Operation

When the user of the key telephone unit 14a terminates talking and hangs the transceiver upon the hook of the main body 21 of the telephone set a hook switch circuit 51 interlocked with the hook sends a signal to the encoder 54 thus producing a three bit data output "000". This operation is performed irrespective of whether either one of the line selection buttons $21_1$ through $21_7$ depressed or not. If desired, this operation can be performed by automatically resetting the line selection button in accordance with the operation of the hook switch.

The "000" data signal from the encoder 54 is sent to the input shift register 36 via the output shift register 55, the data transceiver 56, the data cable 16a and the data transceiver 35. When this "000" data signal is applied to the coincidence circuit 40 an output not coinciding with the output data of the memory device is produced thereby supplying such noncoincidence signal to the memory device 38 to act as a reset signal. Consequently, the content of the memory device 38 is reset and the station unit 31a returns to the original state where no line is selected.

F. Data Transmission

FIGS. 4A, 4B and 4C are waveforms of the pulses utilized in the system of this invention and the prior art system.

Usually, a data transmitting system using pulse codes is determined by the characteristic of the transmission line and the method of detecting the pulse codes on the receiving side. At present, a unidirectional RZ system and a bidirectional RZ system are used. According to the unidirectional RZ system data "1" and "0" are made to correspond to negative voltage and zero voltage or positive voltage and zero voltage respectively. Although this transmitting system is simple, there is a defect that the amplitude and width of the received wave shape are influenced by the variations in the attenuation and characteristics of the transmission line. For this reason, this system is not suitable for long distance line and used for relatively short line. According to the bidirectional RZ system data "1" and "0" are made to correspond to positive voltage and negative voltage respectively. With this system even though the spacing between adjacent symbols is not constant, the received waveform always resets to zero between adjacent symbols. In this manner so called bit synchronism is always maintained correctly so that the signal is not affected by a waveform distortion. For this reason, this system is suitable for use in a low speed digital communication, for example a data transmission.

However, when data are transmitted by such unidirectional and bidirectional RZ systems, due to various transmitting characteristics such as the high and low band characteristics of the transmission line and the characteristics of a transformer where a series of signals having the same level as the "1" waveform utilized in the unidirectional RZ system and the "1" and "0" waveforms shown in FIG. 4A and utilized in the bidirectional RZ system are transmitted continuously, the base line of the received waveform varies with the pulse pattern as shown in FIG. 4B thus causing an intercode interference with the result that signal waves involving so-called accumulated phenomena would be formed. In other words, the component of the opposite polarity of the received waveform increases gradually so that when such wave is reconstructed and read on the receiving side the polarity of the signal would be misjudged.

For the purpose of solving above described problem of the prior art transmitting system, in the data transmitting system of this invention data "1" and "0" are transmitted by using a waveform as shown in FIG. 4c comprising a waveform of one polarity corresponding to a binary data followed by a waveform of the opposite polarity. With this waveform, different from the prior art unidirectional and bidirectional RZ systems in which the width and amplitude of the received waveform are influenced by the transmission characteristics, even when a series of signals having the same level are transmitted continuously the base line of the received waveform is not varied by the pulse pattern thus completely eliminating the cummulative phenomena resulting in an inter-code interference. Accordingly, it is possible to transmit data over a long distance by using waveforms of high quality. In the unidirectional RZ system, if "0" signals are transmitted continuously, it is difficult to synchronize bits on the receiving side but this defect can be completely eliminated by the system of this invention.

In FIG. 4c, data "1" uses a pulse comprising a combination of a positive pulse and a negative pulse, whereas data "0" uses a pulse comprising a combination of a negative pulse and a positive pulse, but pulses containing positive and negative pulses of the opposite order can also be used.

EXAMPLES OF VARIOUS COMPONENTS

A. Switching Network

FIG. 5 shows the detail of the switching network 32a of the main device 12 in which the office line includes seven lines 11a through 11g. Actually, however, since the talking cable 15a comprises two lines another circuit identical to that shown in FIG. 5 is also provided.

The switching network 32a comprises a network 71 comprising a combination of respective contacts x, y, z of relays 70x, 70y and 70z operating in accordance with the data of respective bits representing the states of line selection key buttons of the key telephone unit 14a, and with the line selection signals sent from the first station unit 31a, and a normally opened contact 72a related to a relay 72 supervizing the interruption of source. The normally closed contacts of the contacts $x_1$ through $x_4$ are connected with lines 11b, 11d and 11f respectively, whereas the normally opened contacts are connected with lines 11a, 11c and 11e respectively. The normally closed contacts of the contacts $y_1$ and $y_2$ are connected with contacts $x_1$ and $x_3$ respectively, and the normally opened contacts are connected with contacts $x_2$ and $x_4$ respectively. The normally closed contact of contact $z$ is connected with contact $y$ whereas the normally opened contact of contact $z$ is connected with contact $y_2$. In other words, the contacts of relays 70x, 70y and 70z are arranged in the form of a tree.

The normally opened contact 72a operated by the source interruption supervisory relay 72 is connected between the normally closed contact of contact $x_1$ and the line 11a. With the network 71 comprising above described combination of various contacts $x$, $y$ and $z$, where the data of the lines encoded according to aforementioned table are sent from the memory device 38 of the first station unit 31a, corresponding relays 70x, 70y and 70z operate. For instance, when data "0010" shown in the Table is sent from the memory device 38 to the switching network 32a to act as a line selection signal, only relay 70x operates but other relays 70y and 70z do not operate. Upon operation of relay 70x, its contacts $x_1$ through $x_4$ are switched to the opposite (lower) sides so that line 11a from the line circuit 30a will be connected to the output side of the switching network 32a via contacts $x_1$, $Y_1$ and $z$ and also to the key telephone unit 14a via talking cable 15a.

The source interruption supervisory relay 72 shown in this embodiment operates as follows. Thus, when the source of supply for the key telephone system is interrupted, relays 70x, 70y and 70z cannot operate so that the connection between the line and the telephone unit will be interrupted. In response to such fault, the source interruption supervisory relay closes its normally opened contact 72a. Accordingly, the key telephone unit 14a is forcibly connected to the office via line 11a so that the telephone unit 14a can be operated by the source in the office when the source of the unit is interrupted. Thus, the key telephone unit 14a can communicate through line 11a.

To perform this operation by the source interruption supervisory relay 72, it is connected such that it is energized when the source of the main device is connected and deenergized when the source is disconnected. Thus for example, the source interruption supervisory relay 72 is connected to the power source through a switch 73.

With this construction, it is possible to automatically connect the line to the key telephone unit when the source of the main device is interrupted to disable the key telephone system.

While in this embodiment, a source interruption supervisory relay is combined with the switching network 32a adapted to connect a line 11a with the key telephone unit 14a where source interruption supervisory relays corresponding to other lines are provided for other switching networks it is possible to automatically connect other lines to the key telephone unit where the source thereof fails or the source of the main device is interrupted.

B. Data Transceiver, Output Shift Register and Common Control Circuit

FIG. 6 shows the detail of the data transceiver and a portion of the output shift register 41 of the first station unit 31a shown in FIG. 2. As shown the output register 41 comprises a shift register having a plurality of bits of the number equal to the number of the lines plus 1. Thus the shift register 80 includes 8 bits, 8 preset terminals $P_1$ through $P_8$ for parallely applying input data, a set terminal $S_1$, an input terminal $I_1$, and an output terminal $O_1$. Each one of the preset terminals is connected to one corresponding line so that the signal from the line circuit 30a is applied to the preset terminal $P_1$ via a line $C_4$. Further, the preset terminal $P_8$ is connected to receive a common signal from respective lines through a line $C_5$. This signal is a bell signal for driving the ringer of the key telephone unit. The signals supplied to preset terminals $P_1$ through $P_8$ represent the states of respective lines, that is busy, idle, incoming and reservation states. The signal from the line circuit is used as the data for driving the key button indicator 63 of the key telephone unit 14a. Further, to the set terminal $S_1$ is applied a set pulse $A_4$ from the common control circuit 33, and a second clock pulse $A_2$ is applied to the input terminal $I_1$ from the common control circuit 33 via an inverter 81 to shift the content of the shift register 80. A signal overflow from the shift register 80 as a result of shifting the content thereof by a shift pulse applied to the input terminal $I_1$ appears on the output terminal $O_1$ and this signal is sent to the data transceiver 35.

The data transceiver 35 comprises six NAND gate circuits 85 - 90, two PNP transistors 91 and 92, a transformer 93 provided with an intermediate tap, inverters 95, 96 and 97, PNP transistors 100 and 101 with their emitter electrodes commonly connected, an NPN transistor 102, a NAND gate circuit 103, an inverter 104, a J-K flip-flop circuit 105, resistors 107 through 112 and capacitors 113 and 114.

The data pulse from the output terminal $O_1$ of the output register 41 is applied directly to one input terminals of the NAND gate circuits 86 and 87, whereas a first clock pulse $A_1$ from the common control circuit 33 is applied to one input of the NAND gate circuit 85 and the other input of the NAND gate circuit 87. To the other input of the NAND gate circuit 85 is applied the data pulse from the output terminal of the shift register 81 via an inverter 95, and the output from the inverter 95 is also applied to one input of the NAND gate circuit 88. The second clock pulse $A_2$ from the common control circuit 33 is applied to the other inputs of the NAND gate circuits 86 and 88. The outputs from the NAND gate circuits 85 and 86 are applied to the inputs of the NAND gate circuit 89, the output thereof being applied to the base electrode of transistor 92 via inverter 96. The outputs of the NAND gate circuits 86 and 88 are applied to the inputs of the NAND gate circuit 90 while the output thereof is connected to the base electrode of transistor 91 via inverter 97. The emitter electrodes of transistors 91 and 92 are connected to the positive pole (for example at 0 volt) of a DC source, not shown, and across the collector electrodes is connected the primary winding 93p of a transformer 93, the center tap of the primary winding being connected to one terminal of a source having a voltage of $-8V$, for example. The secondary winding of the transformer 93 comprises two sections 93$_{S1}$ and 93$_{S2}$ connected in series through a capacitor 113, and one terminals of these sections are connected to the data cable 16a. These primary and secondary windings are wound in the same direction. The juncture between the secondary winding section 93$_{S2}$ and the capacitor 113 is connected to a source of 0V or ground. The juncture between the secondary winding section 93$_{S1}$ and the capacitor 113 is connected to a source of −48V. These sources are used to apply DC power to the key telephone unit 14a through cable 16a.

A resistor 111 is connected across the primary winding 93p of the transformer 93. The opposite terminals of the primary windings are connected to the base electrodes of transistors 100 and 101 respectively through resistors 107 and 108. As above described, the emitter electrodes of these transistors are commonly connected and the collector electrodes are connected to a source of 0V respectively through resistors 109 and 110. The collector electrodes are also connected to the inputs of the NAND gate circuit 103, the output thereof being connected to a clock terminal of a flip-flop circuit 105 via a differentiating circuit comprising a resistor 112 and a capacitor 114. The J, K input terminals of the flip-flop circuit 105 is connected to a source having 0V and the set terminal S$_2$ to a −8V source. The reset terminal R$_2$ of flip-flop circuit is connected to receive a reset pulse A$_5$ from the common control circuit 33 and the output from the output terminal Q is sent to the shift register 36 as a recovered clock pulse. The collector electrode of transistor 100 is also connected to the input terminal of the shift register 36 to supply the data received from the key telephone unit 14a to the input shift register.

The commonly connected emitter electrodes of transistors 100 and 101 are connected to the collector electrode of transistor 102 while the emitter electrode thereof is connected to the −8V source. A transmission-reception transfer pulse A$_3$ from the common control circuit 33 is applied to the base electrode of the transistor 102.

FIG. 9 is a block diagram showing the detail of the common control circuit 33 producing a signal for commonly controlling various elements of the main device 12. As shown, the common control circuit comprises a pulse generator 120 for producing a pulse having a constant frequency, for example 32 KHz, which is applied to the clock terminal of a binary counter 121. The binary counter 121 divides the frequency of the pulse at a predetermined ratio for producing a plurality of frequency divided output pulses which are applied to a logic circuit 122. The frequency divided output pulses have frequencies of 16 KHz, 8 KHz, 4 KHz . . . , about 1 Hz, for example, when the output of the pulse generator has a frequency of 32 KHz. In response to the plurality of frequency divided output pulses produced by the binary counter 121, the logic circuit 122 produces control pulses A$_1$ through A$_9$ shown in FIG. 10 adapted to control various elements of the main device 12.

More particularly, pulse A$_1$ is used as the first clock pulse for repeatedly producing a predetermined number of (8, for example) pulses having a constant frequency f$_1$, for example 8 KHz, at a predetermined frequency, for example 62.5 Hz. Pulse A$_2$ is used as the second clock pulse for repeatedly producing a predetermined number (8, for example) of pulses having a constant frequency, for example 8 KHz, at a constant frequency of 62.5 Hz for example. Thus, the second clock pulse A$_2$ is identical to the first clock pulse A$_1$ except that their phases are shifted such that the second clock pulse are generated at the intermediate points between the first clock pulses.

Pulse A$_3$ is used as a transmission-reception transfer pulse for causing the data transceiver 35 shown in FIG. 6 to transmit the data to the data transceiver 56 of the key telephone unit 14a shown in FIG. 3 or to receive the data from the data transceiver 56. When the transmission-reception pulse A$_3$ is "1" the data transceiver acts as a receiver, whereas when the pulse A$_3$ is "0" the data transceiver acts as a receiver. The "1" state of the pulse A$_3$ rendering the data transceiver 35 to act as a transmitter is determined in accordance of the instants at which the first and second clock pulses A$_1$ and A$_2$ are produced.

Pulse A$_4$ is used as a set pulse for periodically presetting the output or condition of the line in the output register shown in FIGS. 2 and 6 and produced at a point immediately prior to the conversion of the transceiver 35 into the receiving state at a frequency of 62.5 Hz. This pulse A$_4$ is used also as the reset pulse for the flip-flop circuit 105.

Pulse A$_5$ is used as a set pulse for storing the data from the input shift register 36 in the memory device 38 shown in FIGS. 2 and 8 to be described later. This set pulse is generated at a proper time and at a frequency of 62.5 Hz while the transceiver 35 is in the receiving state.

Pulse A$_6$ is used as a reset pulse for resetting memory device 38 shown in FIGS. 2 and 8. This pulse is also generated at a proper time and at a frequency of 62.5 Hz while the transceiver 35 is in the receiving state. However, it is necessary that the reset pulse A$_6$ must be produced earlier than the set pulse A$_5$.

Pulse A$_7$ is used to set a memory circuit 160 of the line circuit shown in FIG. 12 to be described later.

Pulses A$_8$ and A$_9$, although not specifically shown in FIG. 10, are used for the line circuit shown in FIG. 12 to be described later in which pulse A$_8$ has a frequency of about 2 Hz and is used as a reservation and flickering signal, whereas pulse A$_9$ has a frequency of about 1 Hz and is used as the incoming and flickering signal.

The operations of the data transceiver 35 and the output shift register 41 shown in FIG. 6 will now be described with reference to FIG. 7.

When all lines are busy "0" data are applied to the present terminals P$_1$ through P$_7$ of the output shift register from respective lines. When the set pulse A$_4$ is applied under these conditions the conditions of the lines are set in the shift register 80. If the lines are idle a "1" data are supplied to the present terminals from corresponding lines. For example, in FIG. 2, assuming that line 11a is idle whereas other lines are busy, signals "1", "0", "0", "0", "0", "0", "0" are sequentially applied to input terminals P$_1$ through P$_7$. The data set in the shift register 80 are sequentially sent out starting from the preset terminal P$_8$ near the output terminal O$_1$ in accordance with the second clock pulse A$_2$ sent from the common control circuit 33. As shown, respective terminals are connected to the −8V source via resistor 82.

Suppose now that the first and second clock pulses A$_1$ and A$_2$ have the waveforms as shown in FIGS. 7a and 7b respectively, then both pulses are at "0" state at time t$_0$. Accordingly, the output from inverter 81 is a "1" signal which is applied to the input terminal I$_1$ of the shift register 80. When the second clock pulse A$_2$ changes from "1" to "0" state the content of the shift register 80 is shifted according to the build up variation of the "1" signal supplied to its input terminal $I_1$ from the inverter 81 thus producing on its output terminal $O_1$ data regarding the preset terminal $P_8$ of the least significant bit. This output signal is applied directly to the NAND gate circuits 86 and 87 and to the NAND gate circuits 85 and 88 via inverter 95. In this example it is assumed that this output is "0" having a low voltage level.

Under these conditions when the second clock pulse dephased by $\pi$ with respect to the first clock pulse as shown in FIG. 7b is applied to the NAND gate circuits 86 and 88 at time $t_2$, these NAND gate circuits operate as follows.

Thus, the low level "0" signal from the output terminal $O_1$ and the "1" signal of the second pulse $A_2$ are applied to the inputs of the NAND gate circuit 86, thus producing a "1" output signal. At this time, since the "1" signal from inverter 95 and the "0" signal of the second clock pulse $A_2$ are applied to the inputs the NAND gate circuit 85 produces a high level "1" output.

The NAND gate circuit 87 supplied with the "0" signal from the output terminal $O_1$ and the "0" signal of the first clock pulse $A_1$ produces a low level "0" output, whereas the NAND gate circuit 88 supplied with the high level "1" signal from the inverter 95 and the "1" signal of the second clock pulse $A_2$ produces a high level "1" output. Consequently, the NAND gate circuit 89 supplied with high level "1" and "1" to the inputs thereof produces a low level "0" output whereas the NAND gate circuit 90 supplied with "1" and "0" signals produces a high level "1" output. The output from the NAND gate circuit 89 is inverted by an inverter 96 and a low level "0" signal thus inverted is applied to the base electrode of transistor 92. Similarly, the output from NAND gate circuit 90 is inverted into a high level "1" signal by an inverter 97 and this "1" signal is applied to the base electrode of the transistor 91. As a result transistor 92 is turned ON whereas transistor 91 maintains its OFF state as shown by FIGS. 7c and 7d.

At this time, since a positive pulse indicating the transmission condition is applied to inverter 104 from the common control circuit 33 transistor 102 is turned OFF. Accordingly, transistors 100 and 101 maintain their OFF states irrespective of the variation in the base potential. When transistor 92 turns ON as shown in FIG. 7c, $-8V$ in the lower section of the primary winding $93_p$ of the transformer 93 is applied to the emitter-collector electrodes of the transistor 92 at OV as shown in FIG. 7c thereby inducing in the secondary winding of the transformer a negative pulse voltage as shown in FIG. 7 which is sent over the data cable 16a.

Then, when either one of the first and second clock pulses $A_1$ and $A_2$ is applied to the inputs of the NAND gate circuits at time $t_3$ the following operations are performed.

Thus when "1" and "0" inputs are applied the NAND gate circuit 85 produces a high level "1" output. Since the NAND gate circuit 86 is applied with two "0" inputs it produces a "1" output. As a result, the NAND gate circuit 89 produces a low level "0" output and the inverter 96 produces a high level "1" output. Since two "0" inputs are applied the NAND gate circuit 87 produces a high level "1" output and the NAND gate circuit 88 produces a high level "1" output in response to the "1" and "0" inputs. Consequently, the NAND gate circuit 90 produces a low level "0" output whereas the NAND gate circuit 97 a high level "1" output. As a result, at time $t_3$ either transistor 91 or 92 does not conduct.

At time $t_4$, when the first clock pulse $A_1$ is supplied to the NAND gate circuits, NAND gate circuit 85 produces a low level "0" output, the NAND gate circuit 86 a high level "1" output, and the NAND gate circuit 88 a high level "1" output. Then at this time, the NAND gate circuit 89 produces a high level "1" output whereas the NAND gate circuit 90 a low level "0" output. As a consequence, as shown in FIG. 7c transistor 92 is turned OFF while the transistor 91 is turned ON as shown in FIG. 7d, and current flows through a path including the $-8V$ source, transistor 92, the upper section of the primary winding $93_p$ of transformer 93 and the $-8V$ source, thereby inducing in the secondary winding a positive pulse voltage as shown in FIG. 7e. This positive pulse voltage is sent over the data cable 16a.

The positive pulse voltage shown in FIG. 7e is combined with a negative voltage pulse to form one set of pulse utilized to produce data "0" from the output shift register 41.

When a "1" output is produced by the output shift register 41, since the constant of the shift register 80 is such that it contents of the 7 bits from the least significant bit are "0" negative-positive pulses as shown in FIG. 7e are successively sent over the data cable 16a by the operation described above. However, since the content for the preset terminal $P_1$ is "1" this content is caused to appear on the output terminal $O_1$ by the eighth clock pulse thereby operating the NAND gate circuits 85 through 88 in the following manner.

When the second clock pulse $A_2$ is applied at time $t_5$ as shown in FIG. 7b the NAND gate circuit 85 produces a high level "1" output since it is supplied with the "0" output from inverter 95 and the "0" signal of the first clock pulse, whereas the NAND gate circuit 86 produces a low level "0" output since it is supplied with the "1" signal of the second clock pulse $A_2$ and the "1" output from the shift register 80. The NAND gate circuit 87 supplied with the "1" output from the shift register 80 and the "0" signal of the first clock pulse $A_1$ produces a high level output "1" whereas the NAND gate circuit 88 supplied with the "0" output from the inverter 95 and the "1" signal of the second clock pulse $A_2$ produces a high level "1" output. As a consequence, the NAND gate circuit 89 produces a high level "1" output since it is supplied with "1" and "0" inputs and the NAND gate circuit 90 supplied with "1" and "1" inputs produces a low level "0" output. These outputs are applied to the transistors 92 and 91 via inverters 96 and 97 respectively thus turning OFF transistors 92 as shown on the lefthand side of FIG. 7c and turning ON transistor 91 as shown by the righthand side of FIG. 7d. Accordingly, current flows through a path including the OV source, transistor 91, the upper section of the primary winding of transformer 93 and the $-8V$ source thus inducing a positive pulse voltage in the secondary winding of the transformer.

At time $t_6$ either one of the first and second clock pulses is not applied to the NAND gate circuits, all NAND gate circuits 85, 86, 87 and 88 produce high level "1" outputs, respectively. As a consequence, each of the NAND gate circuit 89 and 90 produces a low level "0" output and hence inverters 96 and 97 produce "1" outputs respectively, thereby turning OFF both transistors 92 and 91, with the result that no pulse voltage is induced in the secondary winding of the transformer 93.

As shown in FIG. 7a, when the first clock pulse $A_1$ is applied to the NAND gate circuit at time $t_7$, NAND gate circuits 85 and 86 produce "1" outputs, NAND gate circuit 87 produces a "0" output and the NAND gate circuit 88 a "1" output. As a consequence, NAND gate circuit 89 produces a "0" output and inverter 96 a "1" output. NAND gate circuit 90 produces a "one" output and inverter 97 a "0" output. As a result, as shown in FIG. 7c, transistor 92 is rendered ON, whereas transistor 91 is rendered OFF as shown in FIG. 7d. Consequently, current flows through a path including the OV source, transistor 91, the lower section of the primary winding of transformer 93.and the −8V source thereby inducing a negative pulse voltage as shown in FIG. 7c in the secondary winding of the transformer. The positive pulse voltage shown in FIG. 7e is combined with a negative pulse voltage to form a pulse signal representing data.

In this manner, in this example, the data sent out to the data cable through the transformer 93 has a waveform as shown in FIG. 8A.

Since −48V DC source is connected across capacitor 113 connected between the two sections of the secondary winding of the transformer a DC power is transmitted to the key telephone unit 14a via the data cable 16a, together with the data described above.

The signal receiving operation of the data transceiver 35 will now be described. The data transceiver 35 receives a 7 bit data signal including a line selection signal consisting of first three bits, a secrecy release signal consisting of the next one bit and a reservation signal consisting of the last bit from the key telephone unit 14a via the data cable 16a.

Suppose now that data "1" is sent to the data transceiver 35 from the key telephone set 14a via the data cable 16a. This data produces a voltage variation across the primary winding $93_p$ of the transformer 93. At this time, since the low level voltage of the transmission-reception transfer pulse $A_3$ is applied to the inverter 104 it produces a positive or 0 volt thus turning ON transistor 102 and also clamping the commonly connected emitter electrodes of transistors 100 and 101 to a low level voltage of approximately −8V. Under these conditions, when a positive pulse is applied to the data transceiver at time $t_{10}$ shown in FIG. 7f, a positive pulse voltage will be induced in the primary winding of transformer 93. As a consequence, transistor 100 is turned ON as shown in FIG. 7h and transistor 101 is turned OFF as shown in FIG. 7g. As a consequence, the collector voltage of transistor 100 becomes to a low level of about −8V and that of the transistor 101 becomes to a high level of about OV. When the voltage of the collector electrodes of transistors 100 and 101 vary in this manner, the NAND gate circuit 103 connected to these collector electrodes produces a positive pulse as shown in FIG. 7i.

When the positive pulse induced in the primary winding of transformer 93 disappears at time $t_{11}$, transistors 100 and 101 are turned OFF so that the inputs to the NAND gate circuit 103 returns to the reference voltage of low level (−8V) thus producing a "0" output. Then, when a negative pulse appears on the primary side of transformer 93 at time $t_{12}$, transistor 101 is turned ON whereas transistor 101 is turned OFF. As a result, the collector voltage is increased to a high level of about OV and the collector voltage of transistor 101 is decreased to a low level of −8V. As a consequence, the NAND gate circuit 103 produces a positive pulse as shown in FIG. 7i.

The output pulse from the NAND gate circuit 103 is delayed a predetermined time by a delay circuit comprising a resistor 112 and a capacitor 114 (having a time constant of about $2 \times 10^{-6}$, for example) and then applied to the clock terminal of the flip-flop circuit 105. The waveform of this pulse is shown by FIG. 7j. In response to the build-up portion of the first pulse the flip-flop circuit is turned ON at time $t_8$ and turned OFF at the build up portion of the second pulse at time $t_q$, thus producing an output pulse as shown in FIG. 7k. This output pulse is sent to the input shift register 36 to act as the recovered clock pulse T.

When data "0" shown on the righthand side of FIG. 7f is received from the key telephone unit 14a via the data cable 16a the system operates as follows.

Thus, when the negative pulse shown in FIG. 7f is applied to the data transceiver 35 at time $t_{15}$, a negative pulse voltage is induced in the primary winding $93_p$ of the transformer 93, thus turning ON transistor 101 and turning OFF transistor 100 as shown in FIGS. 7g and 7h. Consequently, the NAND gate circuit 103 produces a positive pulse as shown in FIG. 7i.

When the negative pulse induced in the primary winding of the transormer 93 disappears at time $t_{16}$, both transistors 100 and 101 are turned OFF and the NAND gate circuit 103 produces a "0" output. Then, when a positive pulse is induced on the primary side of transformer 93 at time $t_{17}$ transistor 101 is turned ON whereas the transistor 100 is turned ON, with the result that the NAND gate circuit 103 produces a positive pulse as shown in FIG. 7i. This output is delayed by the delay circuit as shown in FIG. 7, and in response to the first build up portion of the delayed pulse and the next build up portion the flip-flop circuit 105 produces an output pulse as shown in FIG. 7k. This output pulse is sent to the input shift register to act as the recovered clock pulse.

Since the collector electrode of transistor 100 is connected to the input terminal of the input shift register 36, the change in the collector potential is sent to the input shift register 36 as the received data. Consequently, the shift register 36 will store the data shown in FIG. 7h in accordance with the pulse shown in FIG. 7k. In other words, when the data "1" shown on the lefthand side of FIG. 7f is received from the key telephone unit 14a, a high level data "1" is sent to the input shift resistor 36 whereas when the data "0" shown on the righthand side of FIG. 7f is sent from the key telephone unit 14a, a low level data "0" is sent to the input shift register as the received data.

In this manner, the received data are written into the input shift register 36 in synchronism with the building up of the clock signal shown in FIG. 7k. The operations of the input shift register 36, line selector 39 and the privacy selector 37 will be described hereunder in detail with reference to FIG. 11.

Figure 11:
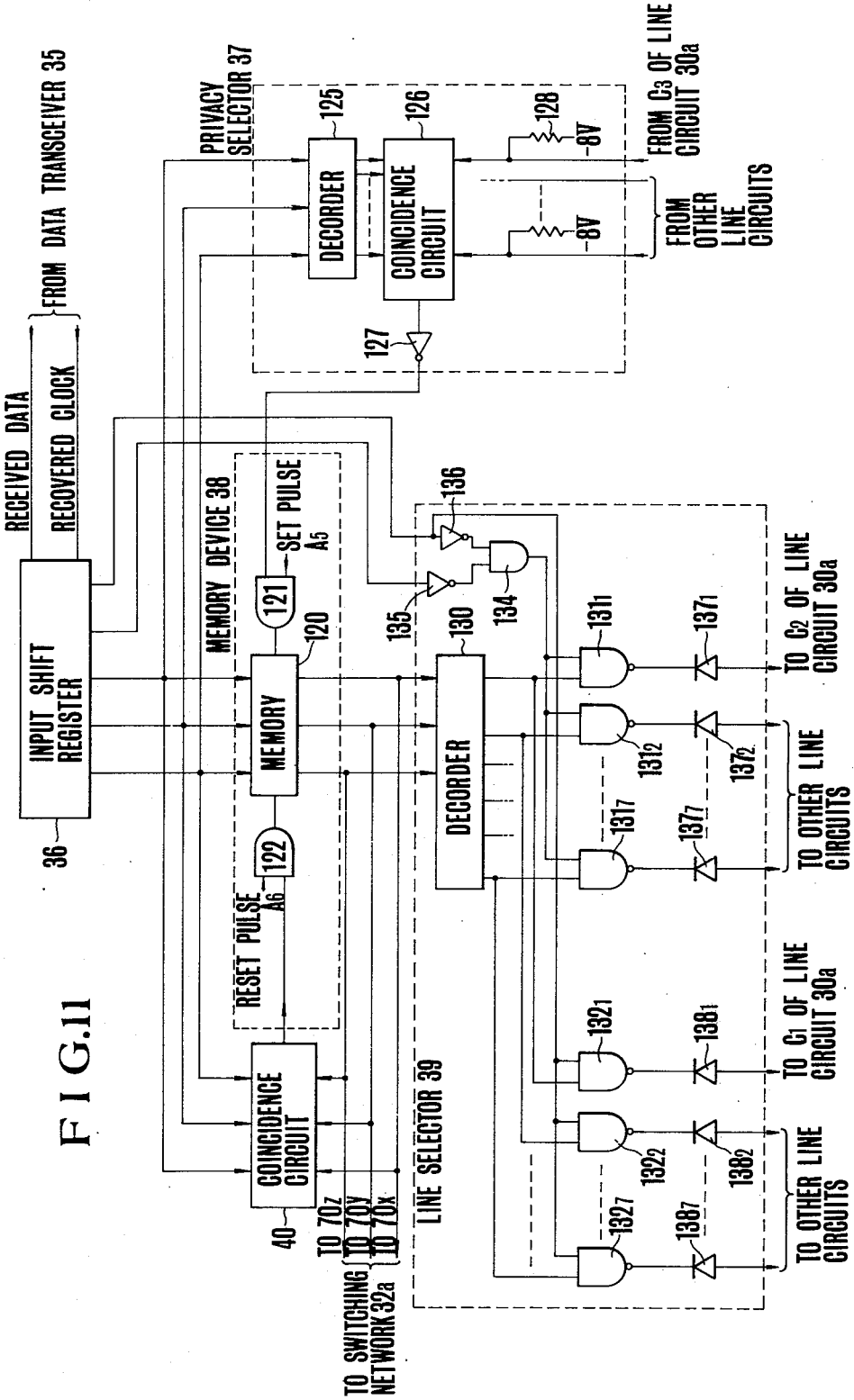
FIG. 11 is a block diagram showing examples of an input register, a memory device, a privacy selector, a line selector and a comparator (coincidence) circuit comprising the station unit shown in FIG. 1.

C. Input shift register, memory device, coincidence circuit and line selector FIG. 11 is a block diagram showing a memory device 38, a line selector 39 and a privacy selector 37 which operate in response to the received data applied to the input shift register 36.

In this example, the input shift register 36 comprises five bits of which 3 bits are used to store the line selection signal, one bit for storing the secrecy release signal, and the remaining one bit for storing the reservation signal. The received data are stored in the order just mentioned.

A line selection signal comprising one bit from the shift register 36 is sent to the memory device 38 and the coincidence circuit 40. The memory device comprises a 3 bit memory device 120 and two AND gate circuits 121 and 122. In response to the output from the AND gate circuit 121, the memory device 120 stores the output from the input shift register 36 and the content of the memory device 120 is erased or reset by the output from the AND gate circuit 122. This reset is made when the output from the memory device 120 is sent to the coincidence circuit 40 and when this output does not coincide with the line selection signal in the input shift register. The output from the coincidence circuit is applied to the AND gate circuit 122 concurrently with the reset pulse $A_6$ from the common control circuit 33 for producing an output from the AND gate circuit 122.

The line selection signal data from the input shift register 36 is also applied to the decoder 125 of the privacy selector 37. The decoder 125 converts the data into a digital code which is applied to a coincidence circuit 126 in the form of a multiplexer where the digital code is compared with the signal from the line circuit. In response to signal $C_3$ sent from the line circuit the coincidence circuit 126 produces a low level signal "0" under the secret state but a high level signal "1" when the secrecy state is released or the line is idle.

For example, when the data sent from the input shift register 36 is a "001" signal, the coincidence circuit 126 produces a "1" output when the line circuit 30a is in a busy state or a secret state. When the line circuit 30a is in an idle state or a secrecy released state the coincidence circuit 126 produces a "0" output.

The output from the coincidence circuit 126 is sent to the AND gate circuit 121 of the memory device 38 via an inverter 127. As can be understood from the foregoing description the AND gate circuit 121 operates to write the output data from the input shift register 36 into the memory device 120 at a timing of the set pulse $A_5$ from the common control circuit 33 when the line circuit is in an idle state or a secrecy released state. A resistor 128 is connected to a conductor from the line circuit 30a.

The outputs from the respective bits of the memory device are also applied to the relays 70x, 70y and 70z respectively of the switching network shown in FIG. 5. Thus, the first bit of the data is applied to relay 70z, the second bit to relay 70y and the least significant bit to relay 70x.

The output from the memory device 120 is also applied to the decoder 130 of the line selector 39. The decoder 130 operates to convert the output data from the memory device into decimal numbers corresponding to respective line circuits. In this manner the output from the decoder 130 corresponds to the number of the line circuits and the respective output terminals are connected to one input terminals of the NAND gate circuits $131_1$ through $131_7$ and $132_1$ through $132_7$. The other inputs of the NAND gate circuits $131_1$ through $131_7$ are connected to commonly receive the output from the AND gate circuit 134, the inputs thereof being connected to the secrecy releasing bit from the input shift register 36 and the output from the reservation bit respectively through inverters 135 and 136. Accordingly the NAND gate circuits $131_1$ through $131_7$ produces a "0" output when no secret release signal and reservation signal is applied, that is in the secret state but produces a "1" output in the other cases, that is when either one of the secret release signal and the reservation signal is applied. These signals are sent to $C_2$ lines of corresponding line circuits via diodes $137_1$ through $137_7$ respectively.

When a "1" reservation signal is sent from the shift register 36, the NAND gate circuits $132_1$ through $137_7$ produce "0" outputs, which are applied to corresponding line circuits via diodes $138_1$ through $138_7$, respectively thus maintaining the lines in the reserved states.

D. Line Circuit

Figure 12:
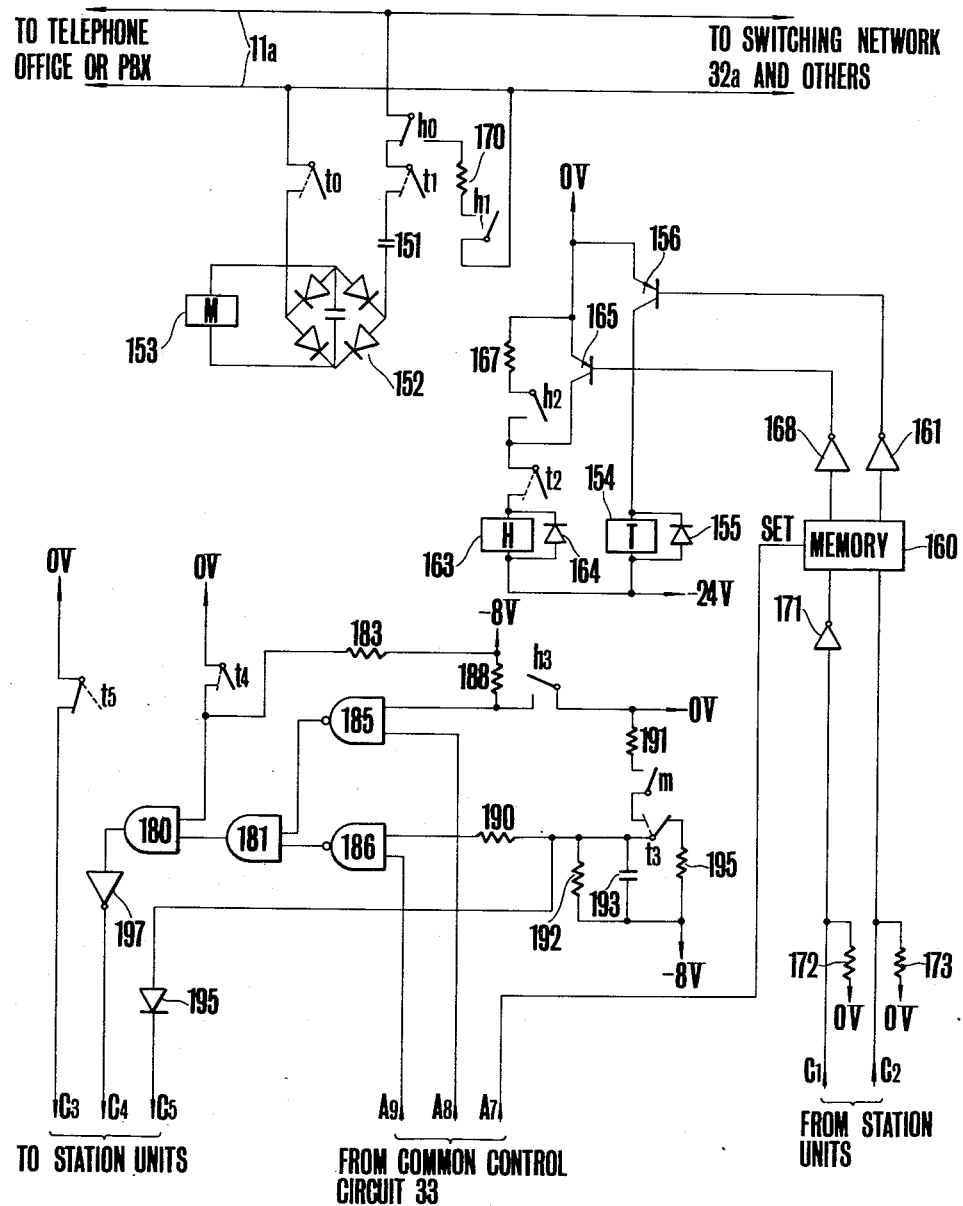
FIG. 12 is a connection diagram showing one example of the line circuit shown in FIG. 2.

FIG. 12 is a connection diagram showing one example of a line circuit 30a utilized in this invention. As shown, a diode bridge circuit 152 is connected across the line 11a via contacts $t_0$, $t_1$ and $h_0$ and a capacitor 151, and a relay coil 153 is connected across the output terminals of the diode bridge 152. $t_0$ and $t_1$ are normally opened contacts of a normally energized relay T while contact $h_0$ is a contact of a normally deenergized relay H. Normally, the contact $h_0$ is closed so as to energize the diode bridge when contacts $t_0$ and $t_1$ are closed.

The coil 154 of relay T is connected in parallel with a diode poled as shown. The coil 154 is connected across the OV source and the $-24$V source through the collector-emitter electrodes of transistor 156 having a base electrode connected to receive the output from the memory device 160 via inverter 161. Normally a low level "1" signal is applied to the base electrode which turns ON transistor 156. The coil 163 of relay H is connected in parallel with a diode 164, and the coil is connected across the OV source and the $-24$ source in series with the collector-emitter electrodes of transistor 165 and a holding contact $h_2$ of the relay H. The electrode of transistor 165 is connected to the memory device 160 via an inverter 168 so as to receive a high level "0" signal for normally maintaining the transistor 165 in the OFF state. The righthand contact $h_0$ of relay H is connected to line 11a via resistor 170 and a normally opened contact $h_1$ to render the line 11a to be in a reserving state.

The memory device 160 comprises two bits, that is a bit for receiving a reservation signal sent from a station unit via an inverter 171 and a bit for receiving a signal concerning secrecy via line $C_2$. These signals are stored in the memory device when a set pulse $A_7$ is received from the common control circuit 33. 172 and 173 show resistors.

The relay T has a normally closed contact $t_5$ with one terminal connected to a OV source and the other terminal connected to the privacy selector 37 of the station units. When contact $t_5$ is closed, the line 11a is in a reply state as well as in the secret state. When contact $t_5$ is opened, this condition shows that the relay T has been operated and the line is in the idle or secrecy released state and not in the secret state.

The line circuit 30a is provided with AND gate circuits 180 and 181 and one input of the AND gate circuit 180 is connected to receive the output of AND gate circuit 181. The other input of AND gate circuit 180 is connected to the OV source via normally opened contact $t_4$ utilized to reply and to the $-8$V source through a resistor 183. The input terminals of the AND gate circuit 181 is connected to the outputs of NAND gate circuits 185 and 186 while one input of the NAND gate circuit is connected to $-8$V source via resistor 188 and to 0V source via the normally opened contact $h_3$ of relay H. The other input of the NAND gate circuit 185 is connected to receive an incoming pulse $A_8$ of 120 mps, for example from the common control circuit 33.

One input of the NAND gate circuit 186 is connected to the 0V source through a resistor 190, two way contact $t_3$ of relay T the normally opened contact $m$ of relay M and a resistor 191. Across the juncture between the two way contact $t_3$ and resister 190 and the $-8V$ source are connected a resister 193 and a capacitor 193 which are connected in parallel. The right hand contact of contact $t_3$ is connected to the $-8V$ source via a rapid discharge resistor 195. The contact $t_3$ is constructed to engage its righthand contact when relay T is not energized. The juncture between resistor 190 and the contact $t_3$ is connected to line $C_5$ via a diode 195 for supplying a ringer signal to the output shift registers 41 (FIG. 5) of respective station units. The output of the AND gate circuit 180 is connected to line $C_4$ via an inverter 197 for the purpose of supplying a lamp flickering signal for indicating a reservation or supplying an incoming signal to the output shift registers (See FIG. 5) of respective station units.

Respective relays in the line circuit 30a are not energized when the source switch is not closed so that respective contacts are maintained in the solid line positions. When the source switch is closed and when the line 11a is idle, a high level "0" signal is applied to the base electrode of the transistor 165 from the memory device 160 via inverter 186, and a low level "1" signal is applied to the base electrode of the transistor 156 from the memory device 160 via inverter 161. Consequently, transistor 165 is turned OFF and transistor 156 is turned ON to energize the coil of relay T, thereby throwing respective contacts of this relay to the dotted line positions. Thus, the contact $t_4$ is closed to enable the AND gate circuit 180. Under these conditions, when a signal arrives the coil 153 of relay M is energized to close its contact $m$. As a consequence, a "1" signal at 0V is applied to the NAND gate circuit 186 and this NAND gate circuit passes an incoming flickering signal $A_9$ from the common control circuit. This incoming flickering signal $A_9$ is sent to line $C_4$ via AND gate circuits 181 and 180 and inverter 197 and thence to the preset terminals $P_1$ of the output shift registers of respective station units. At this time, a ringer signal is sent to line $C_5$ from the 0V source through resister 191, contact $m$, contact $t_3$ and diode 195 and thence to the preset terminals $P_8$ of the output shift registers of respective station units. Since the contact $t_5$ is opened at this time a "0" output is applied to line $C_3$. These signals sent to the output shift register are stored therein by the set pulse from the common control circuit 33 in the same manner as above described. For example, in FIG. 6, the data stored in the shift register 80 is sent out to the data transceiver 35 at the timing of the first clock pulse $A_1$ and thence to the data cable 16a.

Upon arrival of a signal, any one of the telephone units is operated and when a reply is made without depressing the secrecy release button (for example, it is assumed that the user of the key telephone unit 14a has replied), data "00100" is sent to the input shift register 36 from the key telephone unit 14a, and the memory device 120 stores the data "001" of the replied key telephone unit under the control of the "1" output from the privacy selector 37 while at the same time a signal is sent to the switching network 32a to transfer the contact of the relay 70x so as to connect the key telephone unit 14a with a line circuit.

At the same time, in response to the output from the memory device 120 and the output from the input shift register 36, the line selector 39 sends a "1" output to the line circuit 30a via NAND gate circuit 132, diode 138 and line $C_1$ and a "0" output to the line circuit 30a via NAND gate circuit 131, diode 137 and line $C_2$.

When these signals are sent from the key station unit, the memory device 160 of the line circuit 30a stores these signals in accordance with the set pulse $A_7$ from the common control circuit 33. Thus, the memory device 160 stores the "0" signal in response to the "1" signal from line $C_1$ and the "0" signal in response to the "0" signal from the line $C_2$. As a consequence, the memory device 160 produces either one of the "0" signals as its output so that transistors 156 and 165 are turned OFF and the relays T and H are deenergized, thus deenergizing relay M.

As a consequence, the contact $t_5$ of the relay T is opened to send a "1" signal at high level (0V) to the line $C_3$, and the privacy selector 37 sends out a "0" output. Accordingly, thereafter no data is written in the memory device 120 unless relay T is energized again. When the input and output data of the memory device 120 are made to coincide with each other by the coincidence circuit 40, the content of the memory device 120 is cleared at the timing of the reset pulse $A_6$ from the common control circuit 33. The reset pulse $A_6$ is generated later than the set pulse $A_5$ but earlier than pulse $A_7$.

Upon depression of the secrecy release button 22 of the key telephone unit the NAND gate circuit $131_1$ of the line selector 39 shown in FIG. 11 sends out a "1" signal to line $C_2$ through diode $137_1$, thus changing the content of the memory device 160 of the line circuit 30a to "1". As a consequence, the transistor 156 is turned ON to energize relay T and deenergize relay H. This condition is the same as the idle state of the line. Thus, contact $t_5$ is opened and a low level "0" output is sent to line $C_3$, so that the privacy selector 37 of the station unit sends again the "1" signal to the memory device 38. This means that the other key telephone units can make an offer to the replied line. More particularly, when another telephone unit, for example 14b, requests connection to the line 11a under these circumstances the request data is applied to the input shift register of the station unit 31b thus storing the data in the memory device, and the relay contact $x$ of the switching network 32b is transferred to connect the line 11a with the telephone unit 14b.

On the other hand, when the reservation button of the key telephone unit is depressed the NAND gate circuit $132_1$ of the line selector 39 shown in FIG. 11 produces a "0" output. At this time, if the secrecy release button were not depressed, the NAND gate circuit $131_1$ would continue to produce the "1" output. As a result, the "1" signal would be stored in the memory device 160. Accordingly, transistors 165 and 156 are turned ON to energize relays T and H. Under these conditions the relay M is in the deenergized condition.

Then the line 11a is closed through a circuit including line 11a, contact $h_0$ resistor 170, contact $h_1$ and line 11a thus forming a reservation state. At the same time, the NAND gate circuit 185 sends out the reservation pulse from the common control circuit 33. More particularly, since contact $m$ is opened at this time, the NAND gate circuit 186 sends the "1" output irrespective of the pulse $A_9$. Further, as the contact $h_3$ is closed a "1" input is applied to the NAND gate circuit 185 via this contact. The NAND gate circuit 185 sends out said pulse via the AND gate circuits 181 and 180 and the inverter 187. Since contact $t_4$ is closed at this time, the AND gate circuit 180 is also enabled.

E. Data Transceiver of Telephone Unit

One example of the data transceiver of the key telephone unit will now be described with reference to FIG. 13. Since all telephone units have the same construction, the construction of the data transceiver 56 of the key telephone unit 14a will be described in detail. It should be noted that the construction shown in FIG. 13 is substantially the same as that of the data transceiver 35 shown in FIG. 6. For this reason, corresponding elements are designated by the same reference numerals added with suffixes "$t$". The operation of the transceiver 56 is identical to that of the transceiver 35 except data input and output so that detailed description thereof is believed unnecessary except those relating to operations different from FIG. 6. Thus, a DC - DC converter 64 is connected across capacitor 113$t$ on the secondary side of transformer 93 which exchanges data with the data cable 16a. Accordingly, the DC power sent from a source having a voltage of 0–48V of the data transceiver 35 via data cable 16a is extracted and the extracted power is converted by a converter 64 into the voltages (+V, −V) necessary to operate the telephone unit. The output from a delay circuit comprising a resistor 112$t$ and a capacitor 114$t$ is sent to a synchronous pulse detector 58. The purpose of the detector 58 is to extract a clock pulse for synchronizing the operation of the key telephone unit 14a with the clock pulse in the main device 12. The Q output from the flip-flop circuit 105$t$ is applied to the input shift register 62 to act as a recovered clock for storing the recovered data output from transistor 100$t$ in the input shift register 62. A reset pulse $B_4$ from the telephone control circuit 59 is applied to the reset terminal R of the flip-flop circuit 105$t$. Furthermore, a transmission-reception transfer pulse $B_3$ from the telephone control circuit 59 is applied to an inverter 104$t$.

The detail of the operation is substantially the same as that of FIG. 6 except that the data to be transmitted or received are opposite to those processed by the data transceiver 35 of FIG. 6, in other words, the data transceiver 56 receives the data shown in FIG. 8A and transfers the data to the input shift register 62. The data transceiver also receives the data shown in FIG. 8B from the output register 55 and transfers the data to the data cable 16a.

F. Synchronous Pulse Detector

Figure 14:
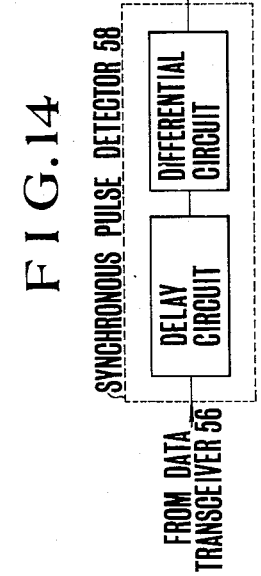
FIG. 14 is a block diagram showing one example of the synchronism detector utilized in the telephone unit shown in FIG. 3.

FIG. 14 shows the detail of the synchronous pulse detector 58 which receives the pulse applied to the clock terminal of the flip-flop circuit 105$t$ of the data transceiver 56, that is the pulse applied through the NAND gate circuit 103$t$ and the delay circuit. The detector 58 includes a delay circuit 200 for delaying a predetermined time a signal sent from the data transceiver 56 and a differentiating circuit 201 for differentiating the output of the delay circuit. The output of the differentiating circuit 201 is applied to the telephone control circuit 59.

The delay circuit 200 is constituted by a one shot circuit for example and constructed to be set by the data firstly sent from the main device 12 and maintain its state while the data is being sent from the main device. In this example, the output of the synchronous detector 58 has a frequency of 62.5 Hz.

G. Telephone Control Circuit

Figure 15:
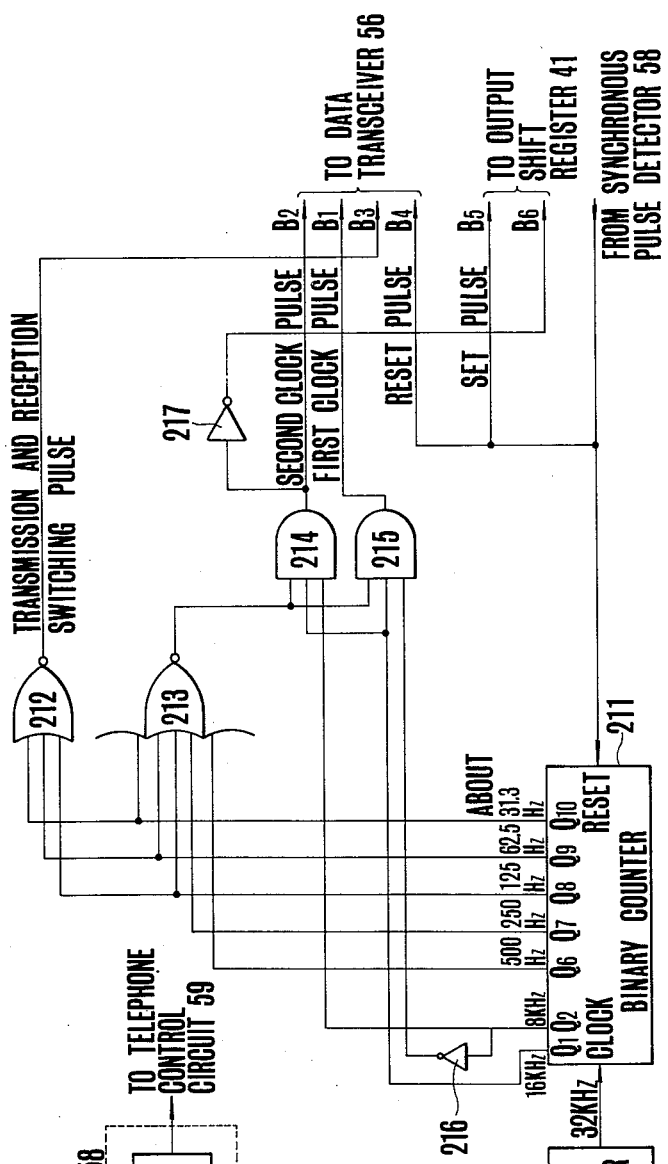
FIG. 15 is a connection diagram showing one example of the telephone control circuit for the telephone unit shown in FIG. 3.

FIG. 15 shows the detail of one example of the telephone control circuit 59 comprising a clock pulse generator 210 which generates a pulse of a constant frequency of 32 KHz, for example, that is applied to the clock terminal of a binary counter 211. The binary counter 211 functions to divide the frequency of the output from the clock pulse generator 210 for producing outputs $Q_1$, $Q_2$, $Q_6$–$Q_{10}$. Assuming an input of 32 KHz, $Q_1$ has a frequency of 16 KHz, $Q_2$ 8 KHz, $Q_6$ 500 KHz and $Q_{10}$ 31.3 Hz. It will be noted the frequency is successively reduced to one half. NOR gate circuits 212 and 213, AND gate circuits 214 and 215 and inverters 216 and 217 constitute a logic circuit for generating a pulse for controlling various elements of the key telephone unit 14a. To the inputs of the NOR gate circuit 212 are applied the outputs $Q_8$–$Q_{10}$ of the binary counter 211, and to the inputs of the NOR gate circuit 213 are applied the outputs $Q_6$–$Q_{10}$ of the binary counter. Outputs $Q_1$ and $Q_2$ and the output from the NOR gate circuit 213 is applied to the inputs of the AND gate circuit 214 while to the inputs of the AND gate circuit 215 are applied the inverted outputs $Q_1$ and $Q_2$ by inverter 216 and the output from the NOR gate circuit 213.

The output from the AND gate circuit 215 is used as the first clock pulse $B_1$, that of the AND gate circuit 214 as the second clock pulse $B_2$, and the inverted output of the AND gate circuit 214 or the output from the inverter is used as the shift pulse for the output shift register 41. The output of the NAND gate circuit 212 is used as the transmission-reception transfer pulse $B_3$. The pulses $B_1$–$B_3$ are transmitted to the data transceiver 56. The signal from the synchronous detector 58 is applied to the reset terminal of the binary counter 211 of the telephone control circuit 59 and this signal is also applied to the data transceiver as the reset signal $B_4$ and to the output shift transistor 41 as the set signal $B_5$. The output $Q_{10}$ is used to prevent step out which occurs when the key telephone unit and the main device operate at the same frequency.

The waveforms of the first and second clock pulses $B_1$ and $B_2$ among the pulses sent through the telephone control circuit 59 correspond to the waveforms of the pulses $A_1$ and $A_2$ of the common control circuit 33 shown in FIG. 10. The waveform of the transmission-reception transfer pulse $B_3$ corresponds to that of the pulse $A_3$ and the waveform of the pulse $B_4$ corresponds to that of the pulse $A_4$.

These pulses are sent to the data transceiver 56 for operating the various elements thereof. The waveform of the pulse $B_5$ used as the set pulse of the output shift register 41 corresponds to that of the pulse $A_4$ of the common control circuit 33 shown in FIG. 10. In the same manner, the waveform of the shift pulse for the output shift register 41 corresponds to that of the output of inverter 81 included in the main device 12 shown in FIG. 12.

It is to be understood that the data can be transmitted over the data cable by a conventional data transmission system instead of the transmission system described above.

Figure 16:
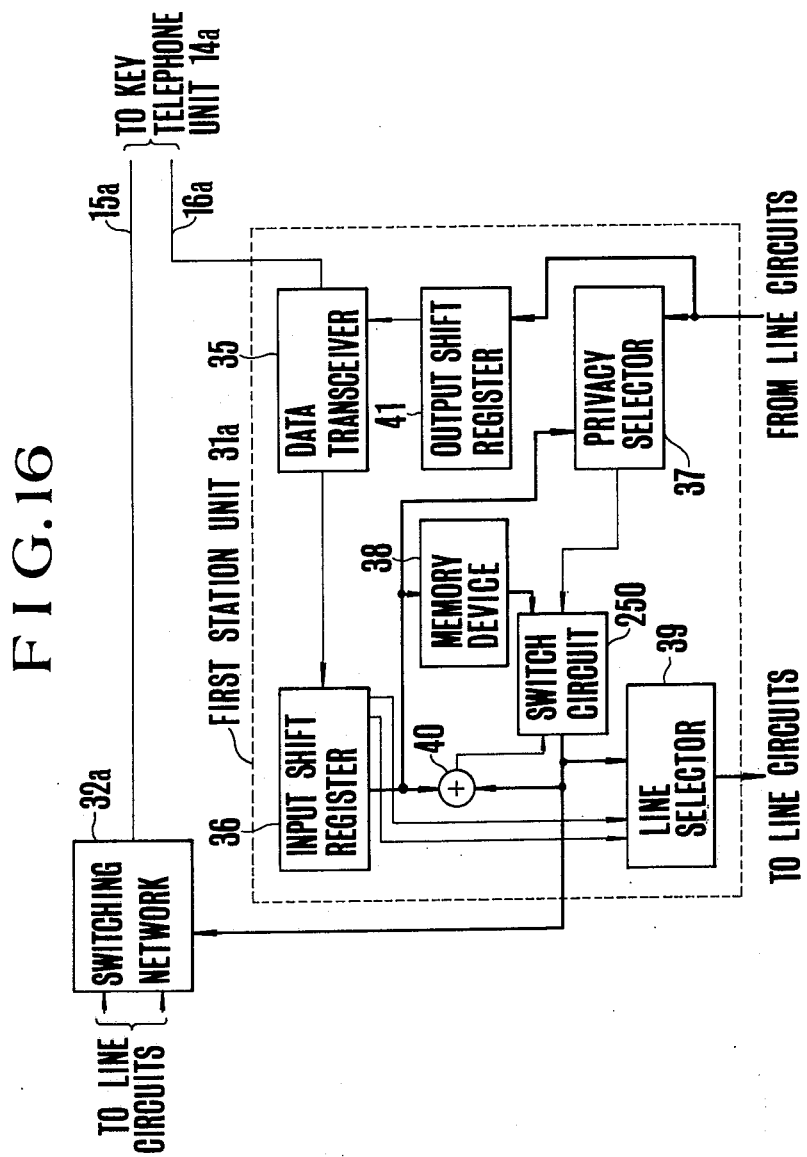
FIG. 16 is a block diagram showing a portion of a modified main device of the key telephone system of this invention.

FIG. 16 is a block diagram showing another embodiment of this invention in which elements corresponding to those shown in FIG. 2 are designated by the same reference numerals. This modification is different from the embodiment shown in FIG. 2 in that the data sent from the key telephone unit 12a is once stored in the input shift register 36 of the station unit 31a and then read out from the shift register 36 and stored in the memory device 38, and that a switching circuit 250 interposed between the memory device 38 and the switching network 32a is driven by a coincidence signal or an OK signal sent from the privacy selector 37 to send the data stored in the memory device 38 to the switching network 32a to act as the line selection signal. In this embodiment, the switching circuit 250 is set by the coincidence signal from the privacy selector 37 and reset by the non-coincidence signal from the comparator 40. Accordingly, this modification can also prevent tapping of the speech in the same manner as in the previous embodiment.

FIG. 17 shows the detail of the switching circuit 250 shown in FIG. 16 comprising an S-R flip-flop circuit 251 and five AND gate circuits 252–256. The signal from the coincidence circuit 40 is applied to the set terminal of the flip-flop circuit 251 via AND gate circuit 255 while the signal from the privacy selector 37 is applied to the reset terminal R of the flip-flop circuit 251 via AND gate circuit 256. These AND gate circuits 255 and 256 are supplied with a reset pulse $A_6$ and a set pulse $A_5$, respectively. The Q output of the flip-flop circuit 251 is commonly applied to one inputs of the AND gate circuits 252, 253 and 254 while the bit data from the memory device 38 are applied to the other inputs of these AND gate circuits, the outputs thereof being supplied to the switching network 32a.

Although the invention has been shown and described in terms of some preferred embodiments thereof it should be understood that the invention is not limited to these specific embodiments and that many changes and modifications will be obvious to one skilled in the art without departing from the scope of the invention as defined in the appended claims.

What is claimed is:

1. In a key telephone system of the type comprising a key service unit and a plurality of non-grouped key telephone units adapted to be connected with said key service unit, each key telephone unit being provided with a plurality of line selection key buttons, the improvement which comprises pairs of a single talking cable and a single data cable extending between said key service unit and respective key telephone units, wherein said key service unit comprises a plurality of line circuits respectively supervising the states of respective lines, a plurality of station units for performing in parallel the supervision of said line circuits and for supplying pulse modulated data signals and an operating power to respective key telephone units through said data cables, a plurality of switching networks controlled in parallel by the outputs from respective station units for connecting a selected line to a key telephone unit corresponding to a predetermined station unit through a line circuit, and a common control circuit for controlling the operations of said line circuits and said station units; and wherein each one of said key telephone units comprises a telephone circuit connected to said key service unit through one of said talking cables, a handset connected to said telephone circuit, means connected to a corresponding station unit of said key service unit through a data cable for supervising the condition of said key telephone unit, said means transmitting and receiving data to and from said station unit, and converting means for converting the pulse modulated signal sent from said station unit into predetermined DC voltage for operating said key telephone unit, wherein each key telephone unit includes means for transmitting data corresponding to a given line selection key button to a station unit from said key telephone unit and said station unit includes means for comparing said data corresponding to a given line selection key button with data transmitted from the associated line circuit to determine whether the line is in a busy state or an idle state and for connecting the line with said key telephone unit when said line is idle.

2. The key telephone system according to claim 1 wherein each station unit comprises a register adapted to temporarily store the data transmitted from said key telephone unit and corresponding to an operated line selection key button, a privacy selector comprising a first comparator responsive to the data in said register and signals from said line circuits for identifying that a line is in a busy state or an idle state and for producing a coincidence signal when said line is idle, a memory device responsive to said coincidence signal produced by said privacy selector for storing the data of said register and for sending the stored data to said switching network to act as a line selection signal, a line selector for setting a line corresponding to the data stored in said memory device to a busy state, and a second comparator for resetting said memory device when the data in said register and the data stored in said memory device do not coincide with each other.

3. The key telephone system according to claim 2 wherein said key telephone unit further includes a secrecy release button, said register of each station unit further adapted to temporarily store a secrecy release signal transmitted from said key telephone unit, and said line selector receives said secrecy release signal temporarily stored in the register to release said line from the busy state.

4. The key telephone system according to claim 3 wherein said line selector transmits control signals to the line circuits, said control signals being used for controlling the line circuits to determine whether or not a busy state should be taken by them.

5. The key telephone system according to claim 1 wherein said station unit comprises a register adapted to temporarily store the data transmitted from the key telephone unit and corresponding to an operated line selection key button, a memory device for storing the data in said register, a privacy selector comprising a first comparator responsive to the data in said register and signals from said line circuits for identifying whether a line is in an idle state or a busy state thereby producing a coincidence signal when the line is idle, a switch circuit responsive to the coincidence signal from said privacy selector for sending the data stored in said memory device to said switching network to act as a line selection signal, a line selector responsive to the operation of said switch circuit for setting a line corresponding to the data stored in said memory device, and a second comparator for rendering inoperative said switch circuit when the data in said register and the data in said memory device do not coincide with each other.

6. The key telephone system according to claim 1 wherein one of the switching networks comprises a source interruption supervisory relay having a contact for forcibly connecting a key telephone unit to a line when a source of power for operating the system is interrupted.

7. The key telephone system according to claim 1 wherein each switching network comprises a source interruption supervisory relay having a contact for forcibly connecting a key telephone unit to a line when a source of power for operating the system is interrupted.

8. The key telephone system according to claim 1 wherein each key telephone unit further comprises a secrecy releasing key button, means for transmitting the data corresponding to said line selection key button and said secrecy releasing key button to said station units, and each station unit comprises means responsive to the data produced by a line selection key button for providing a first reply signal for identifying whether the line corresponding to said data is in a busy state or in an idle state and for connecting the key telephone unit to the selected line when it is idle, and means responsive to different data produced by said secrecy releasing button of the connecting key telephone unit for interrupting a second reply signal from the line circuit which is used to supervise the connecting telephone unit to allow other key telephone units to connect to the connecting telephone unit.

* * * * *